(12) United States Patent
Metzler et al.

(10) Patent No.: US 11,604,065 B2
(45) Date of Patent: Mar. 14, 2023

(54) FULLY AUTOMATIC POSITION AND ALIGNMENT DETERMINATION METHOD FOR A TERRESTRIAL LASER SCANNER AND METHOD FOR ASCERTAINING THE SUITABILITY OF A POSITION FOR A DEPLOYMENT FOR SURVEYING

(71) Applicant: HEXAGON TECHNOLOGY CENTER GMBH, Heerbrugg (CH)

(72) Inventors: Bernhard Metzler, Dornbirn (AT); Jochen Scheja, Hohenems (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 303 days.

(21) Appl. No.: 16/876,041

(22) Filed: May 16, 2020

(65) Prior Publication Data
US 2020/0363202 A1    Nov. 19, 2020

(30) Foreign Application Priority Data

May 17, 2019  (EP) ....................... 19175241
Jul. 9, 2019   (EP) ....................... 19185324

(51) Int. Cl.
| | | |
|---|---|---|
| *G01C 11/08* | (2006.01) | |
| *G06T 7/521* | (2017.01) | |
| *H04N 5/232* | (2006.01) | |
| *G06K 9/62* | (2022.01) | |
| *G06T 7/80* | (2017.01) | |
| *H04N 13/271* | (2018.01) | |

(Continued)

(52) U.S. Cl.
CPC .............. *G01C 11/08* (2013.01); *G01C 11/28* (2013.01); *G06K 9/6215* (2013.01); *G06T 7/521* (2017.01); *G06T 7/70* (2017.01); *G06T 7/80* (2017.01); *H04N 5/23238* (2013.01); *H04N 13/271* (2018.05); *G06T 2207/10028* (2013.01)

(58) Field of Classification Search
CPC .......... G01C 11/08; G01C 11/28; G06T 7/80; G06T 7/521; G06T 7/70; H04N 13/271; H04N 5/23238; G06K 9/6215
See application file for complete search history.

(56) References Cited

U.S. PATENT DOCUMENTS

| | | | |
|---|---|---|---|
| 7,583,373 B2 | 9/2009 | Schwarz | |
| 9,465,129 B1* | 10/2016 | Olsson | ..................... G01V 3/15 |

(Continued)

FOREIGN PATENT DOCUMENTS

| | | |
|---|---|---|
| DE | 102013110581 A1 | 3/2015 |
| EP | 1686350 A1 | 8/2006 |

(Continued)

OTHER PUBLICATIONS

European Search Report in application No. 19185324.1 dated Dec. 12, 2019.

(Continued)

*Primary Examiner* — Mishawn N. Hunter
(74) *Attorney, Agent, or Firm* — Maschoff Brennan

(57) ABSTRACT

One aspect of the invention relates to a fully automatic method for calculating the current, geo-referenced position and alignment of a terrestrial scan-surveying device in situ on the basis of a current panoramic image recorded by the surveying device and at least one stored, geo-referenced 3D scan panoramic image.

15 Claims, 22 Drawing Sheets

(51) Int. Cl.
*G01C 11/28* (2006.01)
*G06T 7/70* (2017.01)

(56) References Cited

U.S. PATENT DOCUMENTS

| | | |
|---|---|---|
| 2015/0085301 A1 | 3/2015 | Becker et al. |
| 2016/0146604 A1 | 5/2016 | Metzler et al. |
| 2016/0187130 A1 | 6/2016 | Metzler et al. |
| 2017/0122736 A1* | 5/2017 | Dold .................. H04N 5/2257 |
| 2017/0123066 A1 | 5/2017 | Coddington et al. |
| 2017/0301132 A1 | 10/2017 | Dalton et al. |
| 2018/0150994 A1* | 5/2018 | Foutzitzis .......... H04N 5/23238 |
| 2018/0158200 A1 | 6/2018 | Metzler et al. |
| 2019/0162853 A1 | 5/2019 | Kumagai et al. |

FOREIGN PATENT DOCUMENTS

| | | |
|---|---|---|
| EP | 1903303 B1 | 3/2008 |
| EP | 2199828 A2 | 6/2010 |
| EP | 3062066 A1 | 8/2016 |
| JP | 2018138883 A | 9/2018 |

OTHER PUBLICATIONS

European Search Report in application No. 19175241.9 dated Nov. 15, 2019.

* cited by examiner

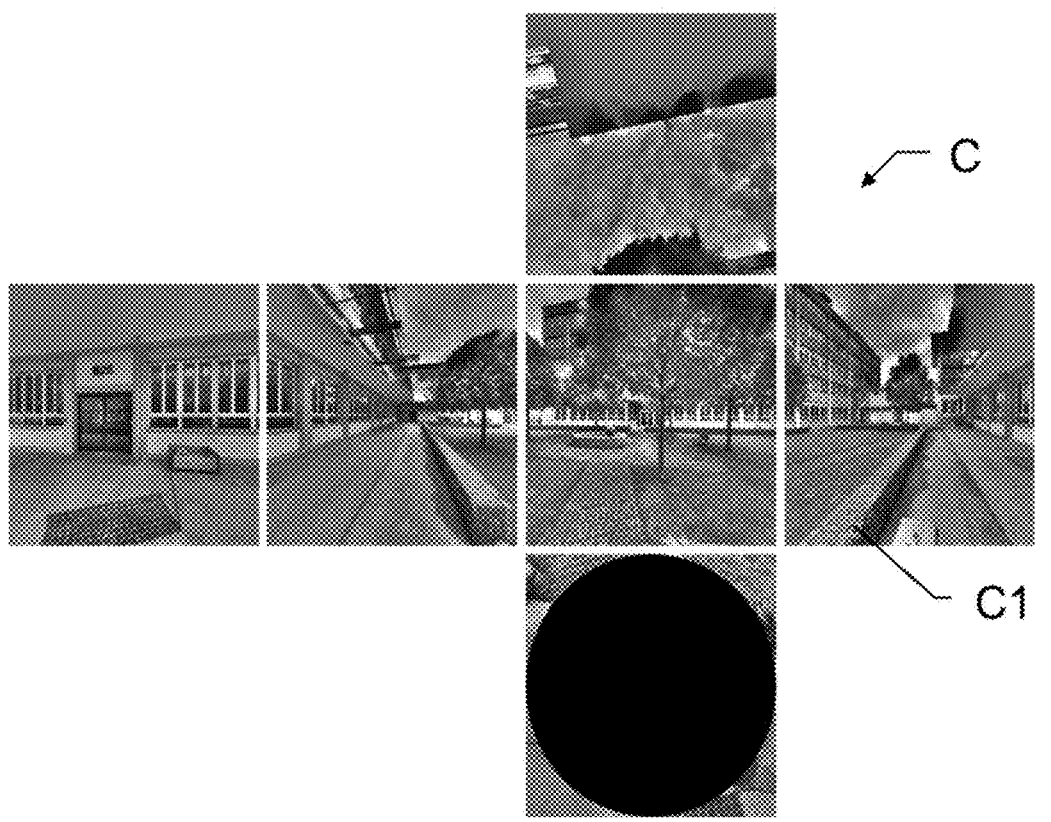
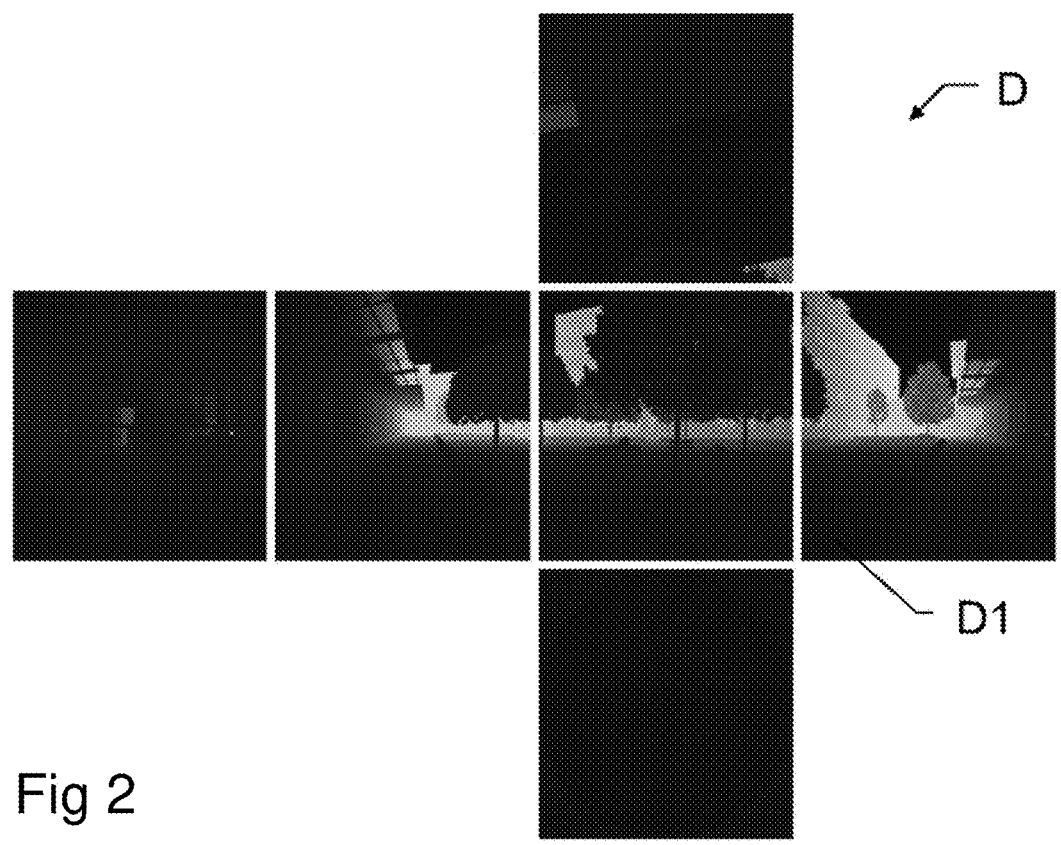
Fig 2

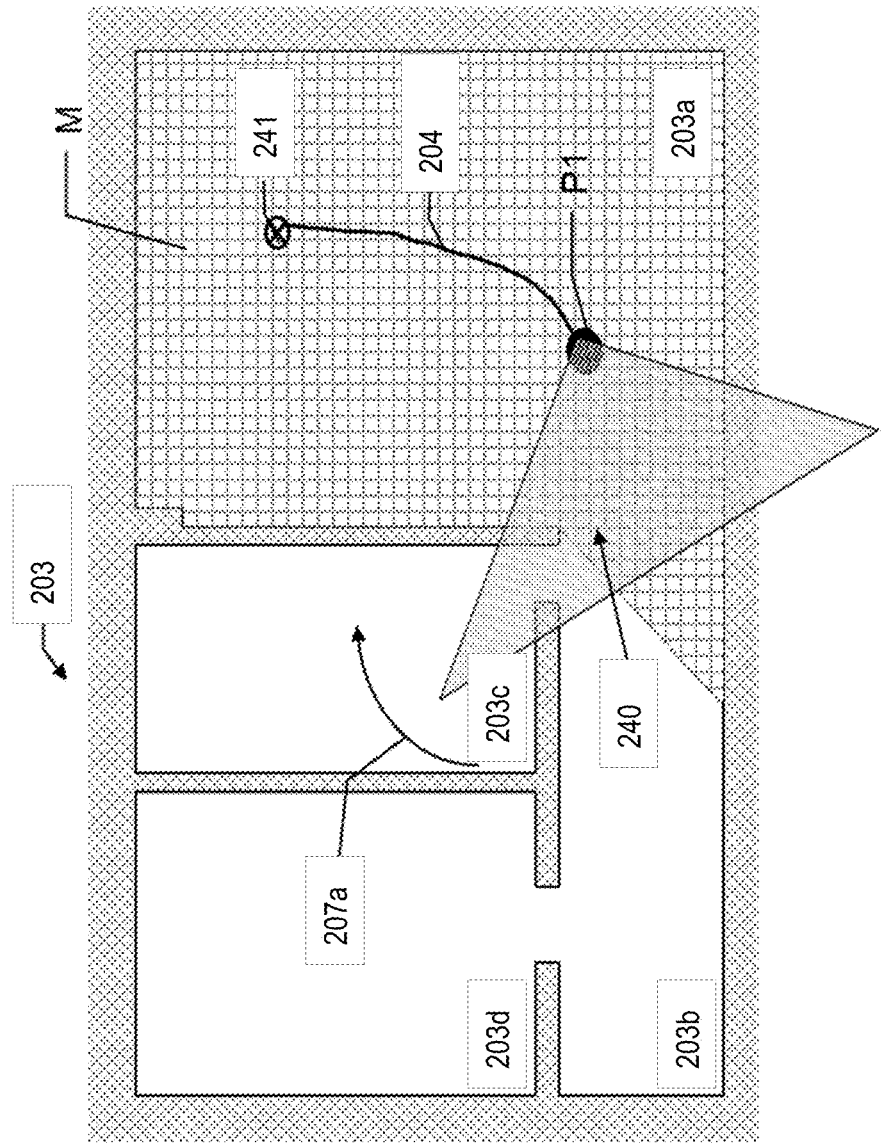

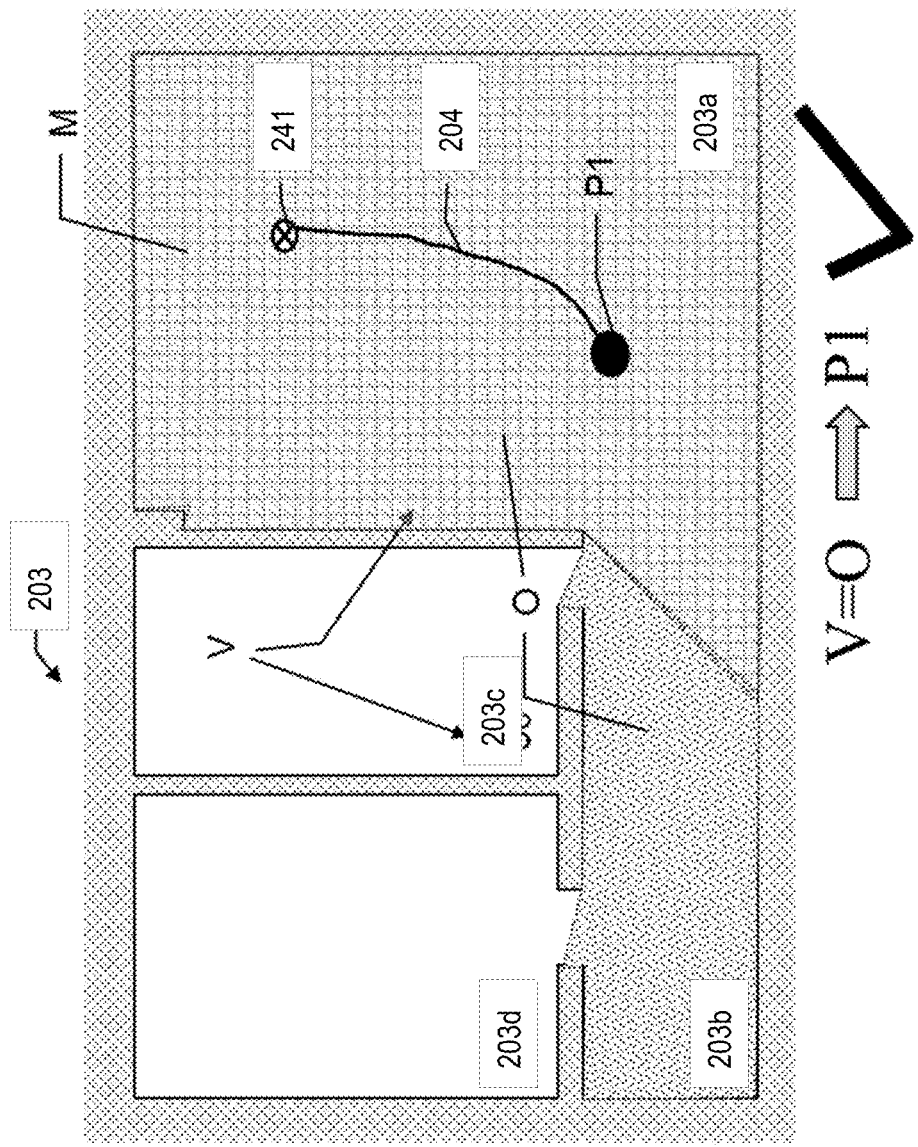

FULLY AUTOMATIC POSITION AND ALIGNMENT DETERMINATION METHOD FOR A TERRESTRIAL LASER SCANNER AND METHOD FOR ASCERTAINING THE SUITABILITY OF A POSITION FOR A DEPLOYMENT FOR SURVEYING

CROSS-REFERENCE TO RELATED APPLICATIONS

This application claims priority to European Patent Application No. 19175241.9, filed on May 17, 2019 and European Patent Application No. 19185324.1, filed on Jul. 9, 2019. The foregoing patent applications are herein incorporated by reference.

SUMMARY

First Aspect of the Invention

Fully automatic position and orientation determination method for a terrestrial laser scanner The first aspect of the invention in some embodiments relate to a position and orientation determination method for a terrestrial surveying device with scan functionality according to the claims.

3D scanning is a very effective technology for producing millions of spatial measurement points of objects within minutes or seconds. Typical measurement tasks are the recording of objects or their surfaces such as industrial facilities, house façades, or historic buildings, but also including accident sites and crime scenes. Surveying devices with scan functionality are, for example, laser scanners such as the Leica P20 or a Total Station or MultiStation such as, for example, the Leica MultiStation 50 which are used to measure or prepare 3D coordinates of surfaces. To this end they must be able to guide the measuring beam of a distance measuring device over a surface and at the same time acquire the direction and distance to the measurement point. Based on the distance, and the therewith correlated direction information for every point, a 3D point cloud is generated by means of data processing.

The principle on which they are constructed means that terrestrial scanners of this sort are designed to acquire a distance to an object point as a measurement point, using a distance measuring unit that in most cases is electro-optical and laser-based. A direction-deflection unit, which is also present, is designed such that the measurement beam of the distance measuring unit is deflected in at least two independent spatial directions, whereby a spatial measurement region can be recorded.

The distance measuring unit can, for example, be implemented in accordance with the principles of time-of-flight (TOF) measurement, phase measurement, waveform digitizer (WFD) measurement or interferometric measurement. For fast, precise scanners in particular, a short measuring time together with a high measuring accuracy is required, for example a distance accuracy in the μm range or less, together with measurement times for the individual points in the range from less than a microsecond up to milliseconds. The measurement range here extends from a few centimeters up to a few kilometers.

The deflection unit can be realized in the form of a moving mirror or, alternatively, through other suitable elements for the controlled angular deflection of optical radiation such as, for example, rotatable prisms, moving light guides, deformable optical components etc. The measurement is usually taken by determining distance and angles, that is to say in spherical coordinates which can also be transformed into Cartesian coordinates for display and further processing.

The absolute location of the surveying device must be known in order to put the measured object point coordinates into relationship with a known reference coordinate system or, putting it another way, to obtain absolute point coordinates. Fundamentally, the station coordinates of the surveying device can be ascertained in situ through what is known as free stationing, through the acquisition of points that are already absolutely referenced. For example, a plurality of target points of known position present in the measurement environment are acquired in the scan, whereby the orientation or alignment of the device can also be ascertained. A referencing of this sort, however, usually needs to be performed at least partially manually, which is time-consuming and prone to error.

The live position of the surveying device can, alternatively, be determined by means of a GNSS receiver attached to the surveying device, using individual satellites as reference points. The lower resolution capacity is, however, disadvantageous, in particular from the point of view of the determination of altitude, when compared with referencing by means of geodetic surveying. In addition, a determination of the alignment of the scanner is only possible with a plurality of receivers, and this, moreover, has an even lower resolution capacity. The process, moreover, necessitates the reception of GNSS signals, and this, above all in interior regions or in tight, convoluted measurement environments, is scarcely possible if at all.

Image-based referencing methods are also known. EP 2199828 A2, for example, proposes a method in the context of mobile scanning with which the position of the surveying device relative to a (moving) reference system is determined from two 3D images of a surrounding region recorded with different angular positions. It is, however, disadvantageous here that a significantly high effort is still necessary in association with the preparation of at least two 3D images from different angular positions.

A generic laser scanner that comprises an inertial measurement unit (IMU) with the aim of tracking a change in the position between two measurements in a measurement environment is described in DE 102013110581 A1. It is disadvantageous to this solution that the need to install an appropriately sensitive inertial measurement unit into the laser scanner, and the restriction that only a temporally uninterrupted change between two locations can thereby be tracked, although not a determination of the current position in the measurement environment if, for example, a scan is to take place again in the measurement environment after a longer period of time such as hours, days, weeks or longer.

The object of some aspects of the first aspect of the invention therefore consists in the provision of a simplified, fully automatic position determination method for a terrestrial scan surveying device.

This object is achieved according to some aspects of the first aspect of the invention by the characterizing features of the independent claims, or these solutions are further developed by features of the dependent claims.

The first aspect of some aspects of the invention relates to a fully automatic method for determining the current, geo-referenced position and alignment of a terrestrial surveying device with scan functionality at the current location on the basis of a set of stored, geo-referenced 3D scan panoramic images, i.e. of panoramic images that, by means of scanning, also represent 3D coordinate data. The 3D scan panoramic images are, for example, stored in a computer memory of the surveying device itself or on an external storage medium—e.g. a cloud—from where they can be called up by the surveying device by means, for example, of Bluetooth, Internet or WLAN. The method is preferably carried out on a computer of the surveying device itself; the processing can, however, also take place externally, e.g. on an external computer or in a cloud, from where the calculated data are transmitted to the surveying device.

The method includes a recording of a panoramic image with the surveying device from the current location, wherein a large number of object points are represented in the recorded panoramic image. A panoramic image here can, for example, be recorded by means of a super-wide-angle objective lens, or created by an all-round camera pan shot, or composed of a plurality of individual images recorded in various directions.

An identification of at least one 3D scan panoramic image with object points conforming to the recorded panoramic image further takes place by means of image matching, for example making use of feature or keypoint matching, or through the application of machine learning or deep learning. Corresponding object points are optionally determined by means of feature matching algorithms, in particular making use of SIFT, SURF, ORB or FAST algorithms.

As a further step, a determination takes place (e.g. calling up or calculating) of the respective geo-referenced 3D coordinates of the corresponding object points on the basis of the identified 3D scan panoramic image and the calculation, for example by means of resectioning, of the current geo-referenced position and alignment of the surveying device on the basis of the positions of the corresponding object points in the recorded panoramic image and their determined geo-referenced 3D coordinates.

Optionally, the stored 3D scan panoramic images represent embedded or linked 3D point clouds in respective 2D panoramic images, for example, color images with a "resolution" of 360*180 pixels, wherein the 2D panoramic images can also be embodied as individual 2D images which, when combined, yield the panoramic view, for example by means of stitching. Alternatively or in addition, the stored 3D scan panoramic images are stored in the form of cubic or conical projections, e.g. with a color channel and combined depth channel. The panoramic image recorded at the current location, in contrast, is preferably a "simple" 2D (digital camera) image, which enables a comparatively simple, fast and inexpensive image acquisition with the surveying device in situ.

Preferably, the set of stored 3D scan panoramic images consists of images representing a surrounding region that are spatially interlinked and which belong together or form a unit, wherein the surrounding region is, for example, an industrial facility, a building or a building complex. The set of 3D scan panoramic images thus represents an associated collection of reference images, all of which are related to a specific environment or a specific object, for example a factory, a cluster of buildings, a building floor or adjoining grounds. The stored 3D panoramic images can, for example, be called up from a database—e.g. stored in a cloud—which is specifically assigned to the present measurement environment or the present object.

As an option, within the context of the method, a movement of the surveying device takes place from the current location along a path to a further location, wherein a series of images is recorded continuously during the movement with the surveying device in the context of a SLAM process (Simultaneous Localization And Mapping), wherein the identified 3D scan panoramic image is employed as an image, in particular a first image, of the image series, finishing the SLAM process at the further location by recording a last image of the image series, recording a 3D point cloud at the further location, and registering the 3D point cloud on the basis of the SLAM process relative to the identified 3D scan panoramic image. The point cloud that is generated at a further stationing by laser scanning is thus registered to the 3D scan panoramic image making use of camera images linked by means of a SLAM algorithm. Making use of the 3D scan panoramic image in the context of the SLAM process here offers, inter alia, the advantage that image points that are already linked to 3D data are present from the beginning.

In a further development of the method, the number of stored (and identified) 3D scan panoramic images to be used for location determination is adjusted to the present measuring situation.

Optionally, in the context of the adjustment, the number of stored 3D scan panoramic images to be used for the location determination is set depending on a measure of the similarity between the recorded panoramic image and the identified 3D scan panoramic image, wherein the measure of similarity can be based on a number of corresponding object points. The measure of similarity represents, for example, a measure for a difference in position between the current location and the location at which the identified 3D scan panoramic image was recorded.

As a further option, in the context of the situational adjustment, the number of stored 3D scan panoramic images to be used for the location determination is set depending on a character of the surroundings of the location determined on the basis of the recorded panoramic image, in particular a minimum distance or mean distance to object points.

Optionally, in the context of the adjustment, the number of the stored 3D scan panoramic images to be used for the position determination is set depending on a desired measure of precision for the current location. The number of reference images on which the determination of position or alignment is based is thus adjusted to a required level of accuracy.

The first aspect of some aspects of the invention further relates to a terrestrial surveying device with scan functionality with a control and evaluation unit that is designed such that the method according to the first aspect of the invention can be carried out with it.

The first aspect of some aspects of the invention also relates to a computer program product that is stored on a machine-readable carrier, in particular of a terrestrial surveying device with scan functionality, or computer data signal, embodied in an electromagnetic wave, with program code that is suitable for carrying out the method according to the first aspect of the invention.

The method according to some aspects of the first aspect of the invention offers the advantage of a simple method with which the position and orientation of a scanning surveying device can be determined fully automatically directly on location, in real time and even before beginning the actual scanning process, when newly stationed in a measurement environment that has already at least in part been acquired by scanning. It is, for example, made possible by means of the method to calculate the position of the device making use only of a panoramic image recorded in situ, for example with a conventional digital camera of the scanner. This means, amongst other things, that setups can still be staggered in situ, even if the measuring activity is interrupted between two setups. It is also advantageous that an accurate location determination is possible inside buildings or, for example, in tunnels.

The in situ effort can, in particular, be kept small in that with the geo-referenced 3D scan panoramic images, a particularly rich data source can be "tapped", which enables a robust determination, made precise through calculation, of the current position, and also of the alignment, on the basis of a simple live image such as, for example, a digital camera panoramic image. In other words, the data "loading" is moved to the database that is to be used, and advantageously only a "light" image of the measurement environment needs to be recorded with the laser scanner itself.

On the basis of the existing three-dimensional point data, a scaling is given or made available from the beginning, whereby advantageously the additional effort for determining a scaling factor e.g. through surveying, scanning or acquiring an object of known size (e.g. a measuring rod) is also unnecessary.

By means of the option of the adjustment—also fully automatic—of the method to the measuring situation that is concretely present, e.g. accuracy requirements, type of the measurement environment or the vicinity of a reference location, the method can be tailored to the actual needs. A tailored optimization of the process effort and result is thereby yielded, without user intervention being necessary here. The method can in this way, for example, be kept as slim as possible.

The position and alignment determination method according to the first aspect of the invention, and the scanner according to the first aspect of the invention, are described in more detail below with reference to the exemplary embodiments schematically illustrated in the drawing purely by way of example.

The second aspect of some aspects of the invention relate to a method for in-situ ascertainment of a suitability of a position of a terrestrial coordinate measuring device, more particularly a laser scanner or a total station, for a setup location according to the claims.

A multiplicity of measurement methods for recording properties of defined points in measurement surroundings, in particular data with a spatial relationship, have been known since antiquity. In the process, the position and alignment of a surveying device and direction, distance and angle to measurement points are recorded as spatial standard data. A theodolite or a total station, provided for highly accurate individual point measurements, represent generally known examples of such coordinate-type surveying devices or geodesic devices. By way of example, a geodesic surveying device of the prior art is described in EP 1 686 350. Another type of generic terrestrial coordinate measuring device relates to scanning devices such as laser scanners, which are embodied to record a very large number of object points in order thus to three-dimensionally map, e.g., building or workpiece surfaces in the form of point clouds. Modern devices can have a camera, which is aligned in a targeted direction and/or able to pan, for capturing an image, the captured image being able to be displayed, in particular, as a live image on the display of the display-control unit and/or on a display of a connected peripheral device such as a tablet, for example.

Such terrestrial, deployable devices comprise angle and distance measuring functions, which allow the determination of a direction and distance to a selected target. Here, the angle and distance variables are ascertained in the internal reference system of the device and still need to be linked to an external reference system for an absolute determination of the position, for the purposes of which, as a rule, the position of the surveying device in the external reference system serves as a basis.

In principle, such station coordinates, and also the alignment of the measuring device at the location, can be calculated as a so-called free setup location from measurements in relation to points in the measurement surroundings that have already been referenced absolutely. The prior art has disclosed a multiplicity of methods that facilitate a referencing of the respective device position for a setup location. Additionally, methods are known, by means of which a plurality of measurement regions of measurement surroundings from different setup locations can subsequently be related to one another or related to one and the same reference system, for example within post processing as a so-called registration of 3D point clouds.

Often, measurement surroundings cannot be surveyed in the entirety thereof from a single setup location, for example because one or more sides of an object face away from the device, because these are angled measurement surroundings (e.g., a plurality of rooms in a building) or because objects are partially shadowed by other objects. Therefore, a single setup location usually does not suffice; instead, the device must survey the measurement surroundings from a plurality of positions. Here, all relevant measurement surrounding regions or all required object points should be surveyed; i.e., gap-free surveying should be implemented. A user often finds it difficult, or requires much time, to decide which positions are suitable for setup location or—particularly if a very large number of setup locations is required—to find an optimal measuring path (as a successive progression of surveying locations) which avoids unnecessary setup locations or repeated surveying without, on the other hand, "missing" regions in the surroundings.

EP 1 903 303 B1 proposes a method for filling surveying gaps, including capturing principal point cloud data from a specified measurement region by a laser scanner, identifying a region without captured data, capturing complementary image data of the region without captured data from at least two directions by an additional image recording apparatus, preparing a stereoscopic image on the basis of the complemented image data obtained by the additional image recording apparatus, capturing complementary point cloud data from the region without captured data by way of an image measurement on the basis of the stereoscopic image, complementing the region of the principal point cloud data without captured data by comparing the principal point cloud data with the complementing point cloud data. Here, the method is provided for post processing. Consequently, in-situ information or advance information about non-captured regions is not available.

EP 3 062 066 A1 discloses a method that can be used to provide in-situ measurement positions, or measurement positions suitable in advance, of a surveying unmanned aerial vehicle (UAV). To this end, reference points of an object are ascertained by means of a terrestrial surveying device such as a total station or a laser scanner, on the basis of which measurement positions for the UAV to be adopted for the purposes of actually surveying the object by means of the UAV can be derived. Thus, a suitable surveying flight path for a surveying UAV can be ascertained in advance using this quite specific and complicated method. However, this teaching is no help for improved surveying from a plurality of locations or for finding improved setup locations by means of a terrestrial device such as a laser scanner or a total station itself.

It is therefore an object of some aspects of the second aspect of the invention to provide a method for automatically assisting with finding a setup location for a mobile or portable terrestrial optoelectronic coordinate measuring device.

In particular, it is a further object of some aspects of the second aspect of the invention to provide such a method in which suitable or optimal successive locations for surveying are successively automatically established and, optionally, provided.

At least one of these objects is achieved by the implementation of the characterizing features of the independent claims. Features that develop the second aspect of the invention in alternative or advantageous fashion can be gathered from the dependent patent claims and from the description, including the description of the figures.

The second aspect of some embodiments of the invention relates to a method for ascertaining a suitable or optimal setup location of a terrestrial optoelectronic coordinate measuring device within measurement surroundings, wherein the coordinate measuring device is embodied for a measuring beam-based determination of object coordinates, e.g., embodied as a laser scanner or total station. Within the scope of the method, a first measurement region is surveyed from a first setup location. Subsequently, for a setup location change, the coordinate measuring device is moved away from the first setup location and, within the scope of the setup location change, a measurement surrounding is automatically optically captured. Based on the captured measurement surrounding, at least one task region is automatically determined as a region of the measurement surroundings to be surveyed. On the basis of measurement surroundings captured thus, at least one visual range is determined as a region of the measurement surroundings which is or would be surveyable from a current position of the coordinate measuring device adopted within the scope of the movement.

The data in respect of measurement region, task region and visual range provided thus serve as a basis for a combined analysis of the first measurement region, the task region and the visual range, by means of which the position is checked for the suitability thereof for a setup location.

Preferably, such a check is implemented in view of a suitability for a second and next setup location, i.e., following or as a direct successor of the first setup location. Consequently, the automatic "live" check of position can ensure that successively adjoining measurement regions of the measurement surroundings are surveyed without measuring gaps arising therebetween.

Preferably, the optical capture of measurement surroundings is implemented continuously during the movement, in particular wherein the task region is continuously updated on the basis of the continuously captured measurement surroundings data and/or the suitability for setup location is likewise checked continuously. Advantageously, the change in position by the movement can be monitored continuously by means of the continuous checking of the respective position such that, e.g., it is possible to immediately determine an unsuitable position or departing from a suitable positioning range is detected immediately.

Preferably, the optical capture of measurement surroundings during the movement is implemented measuring beam-based by means of profiling and/or coarse scanning (a scan with a low resolution/point density). By way of example, the device embodied as a laser scanner is operated in a profiler mode during the position change; i.e., only the axis parallel to the perpendicular is moved such that the measuring beam records a profile of the surroundings (e.g., an outline). As an alternative or in addition thereto, the optical capture is implemented photographically by means of a panoramic image recording, stereo-photogrammetry, a depth image recording, a range image camera and/or an overview camera of the coordinate measuring device.

Optionally, the device has a holding apparatus for a simplified movement, in particular a handle which is configured to allow a user to carry the device in a manner advantageous for capturing the measurement surroundings, in particular wherein the holding apparatus is configured to carry the device when tilted through 90°. Optionally, the device has a display unit for displaying a tilt angle, with the (analogue or digital) display unit being positioned in such a way, in particular, that it is readable by a user carrying the laser scanner when the device is carried in a position tilted through 90°.

Optionally, the comparative analysis contains checking for overlaps of, and/or gaps in, the measurement region, task region and/or visual range, e.g., checking for overlaps of the measurement region and visual range. As a further option, the analysis contains checking for gaps between task region and visual range.

Within the scope of this option, the presence of gaps or overlaps is optionally ascertained on the basis of point correspondences between the regions/ranges, in particular wherein a gap is ascertained on the basis of points in the task region that have no correspondences in either the measurement region or the visual range. Expressed differently, the presence or lack of corresponding points between the regions/ranges is checked.

Here, optionally, point correspondences are ascertained on the basis of point spacings, wherein, as a further option, normal vectors of points are additionally taken into account, and/or point correspondences are ascertained on the basis of a comparison and/or a tracking of local image features, in particular wherein local image features are described by descriptors. Alternatively thereto, local image features can also be described on encodings based on deep learning.

Optionally, a user warning is output within the scope of the method as soon as the position is determined as being unsuitable for a setup location or the check result is negative. By way of example, a warning is implemented acoustically or by means of a luminous display if the current visual range does not facilitate gap-free surveying (any more) or if parts of the task region not surveyed remain along an already traveled path of the movement.

In a development of the method, a result of the check is used to ascertain a location that is suitable and/or unsuitable for surveying a further measurement region and/or a suitable and/or unsuitable location zone and/or existing or potential coverage gaps of the task region and provide these as a user output. Thus, the user is provided with information on the basis of the checked position(s) in respect of which position(s) come into question or, conversely, precisely do not come into question for a survey, in particular for a survey adjoining the preceding survey. Here, a graded classification is also possible; i.e., it is also possible to ascertain the degree of suitability and, e.g., output this as a percentage value such that, for example, limited suitability is presented. Optionally, such information is graphically represented by means of a map of the measurement surroundings in this case, for example by virtue of suitable (unsuitable) surrounding zones or (potential) measurement gaps or (potential) setup locations with (potentially) insufficient measurement overlap being marked in colour or by a pattern.

In the case of an independently mobile coordinate measuring device, an ascertained suitable location can also be adopted independently. Here, as a further option, a suitable alignment or orientation of the surveying device is also ascertained and output and/or this is automatically adopted in the presence of appropriate motorization.

In a further development of the method, ascertaining a suitable position for an optimal second setup location, preferably next setup location, is implemented on the basis of at least one specified optimization criterion. By way of example, gap-free joining of a second or further measurement region to the (first) measurement region with a defined overlap, in particular with a defined minimal overlap, with said first measurement region serves as optimization criterion. By way of example, the overlap is defined in such a way that it is (just) sufficient for the registration of the point clouds of the first and the second measurement region, without generating an unnecessary/redundant "excess" of measured data.

As an alternative or in addition thereto, the optimization criterion could relate to an optimization of the progress of the surveying process, e.g. surveying the entire task region (the entire measurement surroundings) with as few setup locations as possible, as little time expenditure as possible, great geometric accuracy of the setup locations with respect to one another and/or the shortest possible path between the setup locations.

As a further alternative or a further option, the optimization criterion relates to an angle of incidence of the measuring beam on the object surfaces and/or a resolution, in particular a local resolution, of the coordinate measurement. By way of example, optimization is carried out to the effect of ascertaining an optimally suitable position, from which particularly relevant objects or zones (regions of interest) can be surveyed with high resolution and/or in low noise fashion or with a good measuring signal level. By way of example, this automatically classifies positions as unsuitable or less suitable for setup location, said positions facilitating the targeting of an object but (would) yield a point density that is too low or a measurement precision that is too low in one or more objects or zones during the survey.

There optionally is, for example for this reason, an identification of objects within the scope of the optical capture of measurement surroundings, in particular wherein the comparative analysis of the measurement region, task region and visual range is implemented on the basis of such identified objects or the object points thereof. As a further option, objects are classified in the process, for example in respect of the relevance to the survey, for example classified as highly relevant—relevant—irrelevant.

Optionally, objects and/or regions of the surroundings not to be surveyed are filtered within the scope of the ascertainment of the task region. Consequently, objects or regions not of interest are sorted out and not adopted in the task region.

As a further option, measurement surroundings are optically captured using simultaneous localization and mapping, LIDAR-simultaneous localization and mapping, structure from motion and/or dense matching algorithms. As a further option, the capture is implemented using additionally captured data of at least one position, direction and/or acceleration sensor of the coordinate measuring device.

The second aspect of some aspects of the invention further relate to a computer program product having program code stored on a machine-readable medium, in particular on an electronic data processing unit, configured as a control and evaluation unit, of a terrestrial optoelectronic coordinate measuring device, for carrying out at least the following steps of the method according to the second aspect of the invention:

optically capturing measurement surroundings while moving the coordinate measuring device, ascertaining at least one task region, as a region of the measurement surroundings to be surveyed, on the basis of measurement surroundings captured thus, ascertaining at least one visual range, as a region of the measurement surroundings surveyable from a position of the coordinate measuring device adopted within the scope of the movement, on the basis of measurement surroundings captured thus, checking the position for the suitability thereof for a setup location on the basis of a combined analysis of the measurement region, the task region and the visual range.

Moreover, the second aspect of the invention may relate to a terrestrial optoelectronic coordinate measuring device embodied for measuring beam-based determination of object coordinates, more particularly embodied as a laser scanner or total station, wherein the coordinate measuring device comprises one or more optical units embodied to capture, in particular in continuous and/or photographic and/or measuring beam-based fashion, measurement surroundings and a setup location checking functionality. When carrying out the setup location checking functionality, the following are automatically implemented: providing a measurement region as an already surveyed region of the measurement surroundings, optically capturing measurement surroundings by means of the one or more optical units while the coordinate measuring device is moved within measurement surroundings, ascertaining at least one task region, as a region of the measurement surroundings to be surveyed, on the basis of measurement surroundings captured thus, ascertaining at least one visual range, as a region of the measurement surroundings surveyable from a position of the coordinate measuring device adopted within the scope of the movement, on the basis of measurement surroundings captured thus, and checking the position for the suitability thereof for a setup location on the basis of a combined analysis of the measurement region, the task region and the visual range.

Thus, in some embodiments, the method according to the second aspect of the invention advantageously facilitates, in situ, automatic checking of positions of the surveying device for the suitability thereof for setup location. Herewith, the user is unburdened of the task of examining locations in respect of suitability themselves. Thus, the user can move with the device in the measurement surroundings while the device notifies them in respect of suitable positions or warns them of unsuitable positions by way of a continuous suitability check.

In particular, the user can, proceeding from a first setup location, successively proceed through the measurement surroundings, the method being used to automatically ascertain the respective next suitable setup location such that the entire measurement surroundings are successively surveyed from successive setup locations. By way of example, the user picks up the surveying device following a survey from the first setup location, runs until they obtain a stop signal thanks to the method, puts down the device at the position reached at this time or at the most recent position ascertained as suitable, carries out a survey from this second setup location, picks up the device again and lets themselves be guided to the next (third) setup location, etc.

It is particularly advantageous that it is not only a suitable position but also an optimal position that, on the basis of optimization criteria, can be automatically found within the scope of the method. Finding this previously usually needed a skilled, experienced user. By contrast, using the method according to the second aspect of the invention, criteria such as resolution and angle of incidence of the measuring beam on a surface are automatically taken into account, and so surveying can be implemented with optimal parameters in this respect or disadvantageous lower resolutions or angles of incidence, which lead to too great a smearing of the measurement point, can be avoided. Optionally, this is advantageously linked to object recognition and object classification such that optimization criteria can be applied specifically in view of (particularly) relevant objects. Additionally, an optimization can advantageously be implemented in view of the surveying progress as a whole so that the entire measurement surroundings are surveyed in optimal fashion, e.g., with as few setup locations as possible, and hence with optimal setup locations.

The method according to some aspects of the second aspect of the invention and the surveying device according to the second aspect of the invention are described in more detail below in purely exemplary fashion on the basis of specific exemplary embodiments that are schematically illustrated in the drawings, with further advantages of the second aspect of the invention also being discussed.

BRIEF SUMMARY OF THE DRAWINGS

Specifically here
FIG. 2 shows an example of a 3D scan panoramic image according to the first aspect of the invention.

DETAILED DESCRIPTION

Figure 1:
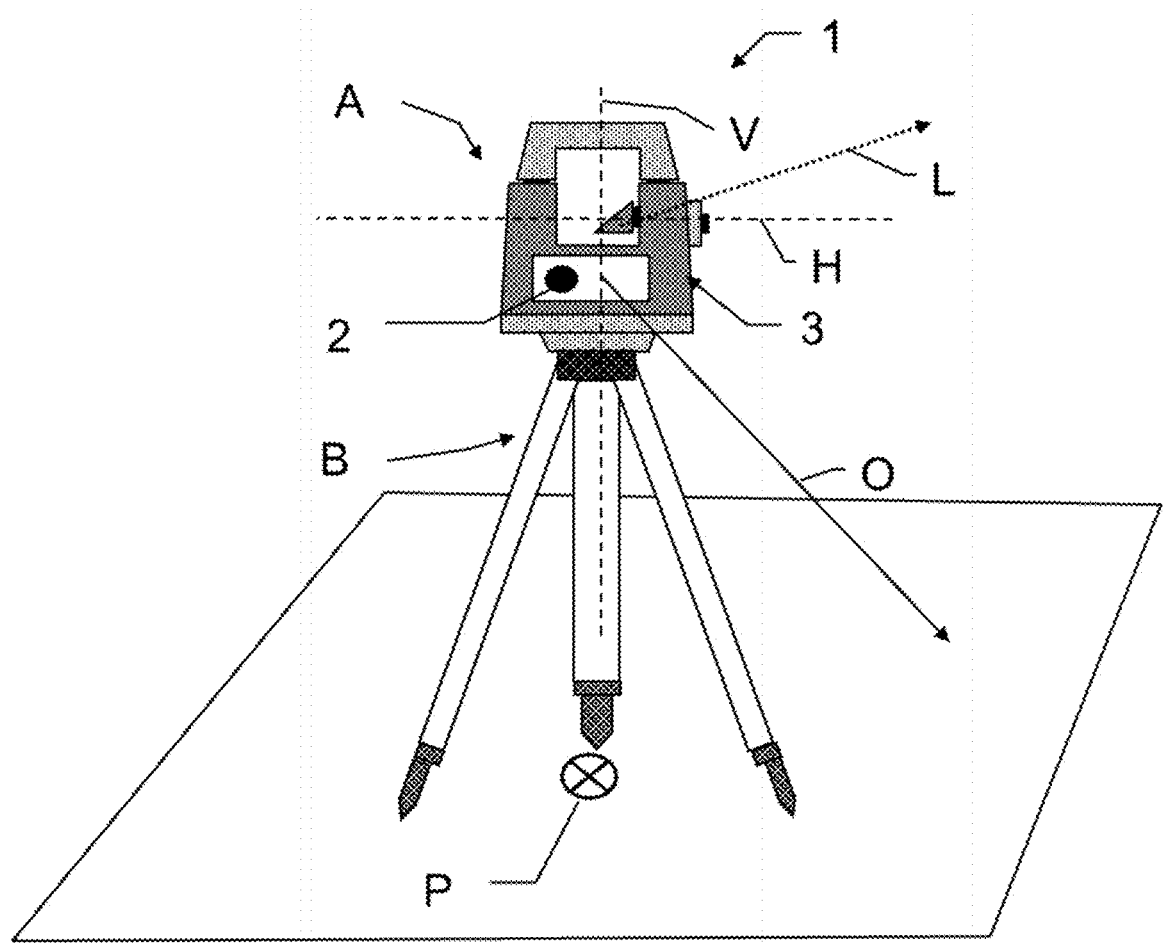
FIG. 1 shows a generic terrestrial surveying device designed as a laser scanner.

FIG. 1 shows a generic terrestrial surveying device that can be designed, for example, as a total station with scan functionality or a scan module or, as illustrated, as a laser scanner 1, for recording (scanning) object surfaces from a stationing position, with a position P and an alignment or orientation O, which can be determined by means of the method explained further below.

The device 1 comprises a source of radiation, which for example is intensity-modulated, for example pulsed, for example a laser source (not illustrated), and an optical system (not illustrated) so that a measuring beam L can be emitted into free space at the target object in an emission direction, wherein the emission direction defines a measurement axis, and the direction of the emission present at the time, or the measurement axis in the internal reference system of the scanner 1 (i.e. relative to an internal zero direction), is measured by one or a plurality of position/angle detectors (not illustrated). The optical system is designed, for example, as a combined transmitting and receiving optical system, or comprises a separate transmitting optical system and receiving optical system for each. Light pulses reflected from the target object are received here by the surveying device 1, and acquired by an optoelectronic detector (not illustrated). Up to a million or more light pulses, and thereby sampling points 98, can, for example, be acquired each second.

For the scanning sampling of the object, the measurement beam L or the emission direction is continuously pivoted and measured, while successively, at short time intervals, at least one measurement is recorded for each object point, including at least one distance value for the respective scan point in the internal reference system, so that a large number of scan points are generated which, as a three-dimensional point cloud, form a 3D image of the object or of the measurement environment. Scan data are thus generated for a respective object point that contain at least angular or direction and distance information. To measure the distance value, the surveying device 1 comprises an electronic controller (not illustrated) which has an evaluation functionality for measuring the respective distance value, e.g. in accordance with the flight time principle (evaluation according to the time-of-flight method).

The pivoting is performed here by means of a beam deflector 3, for example as illustrated, in that an add-on or upper part A above a base B of the surveying device 1 is rotated—relatively slowly—about a first, vertical axis V in steps or continuously, so that the measurement beam L is pivoted horizontally, and the large number of emission directions differ from one another in the horizontal alignment, and in that a pivoting optical component, for example a pivoting or rotating mirror, rotates—relatively quickly—about a horizontal axis H so that the measurement beam L is pivoted in the vertical direction, and the large number of emission directions differ from one another additionally in the vertical alignment. The object surface is thereby for example scanned line by line in a linear grid. The scanning takes place within a predetermined angular range whose boundaries are determined by a horizontal and vertical pivoting width. The angular range in the horizontal sense is 360°, and in the vertical sense, for example, 270°, so that a spherical scan region is present which represents almost the entire surrounding region in all spatial directions. Any other desired angular ranges are however also possible here. Equally, there are forms of realization in which the vertical resolution is not realized through an additional axis of rotation, but through a plurality of simultaneously operating transmitting and receiving units that have a specific, constant angular offset in the vertical direction.

The laser scanner 1, in addition, comprises at least one image camera 2 with which optical images of the object or of the measurement environment can be recorded, preferably color images in RGB format. A (2D) panoramic image can be generated by means of the camera 2. A panoramic image can, for example, be generated in that a plurality of images are recorded and combined while pivoting with the pivoting device 3 through 360°. Alternatively, the laser scanner 1 comprises a plurality of cameras 2 aligned with different angles of view, whose respective images can be combined to form a panoramic image.

A geo-referenced 3D scan panoramic image that serves according to the first aspect of the invention for the subsequent determination of position and alignment when restationing, is created in that the result of the 360° scan or of the 3D point cloud that is generated and the camera-based 360° (2D) panoramic image of a geo-referenced stationing are combined, so that a 3D scan panoramic image, or a textured 3D point cloud, is created, wherein for example a brightness or intensity value (e.g. a grey-scale value) of the measured radiation L is optionally recorded even during the scanning, and taken into account in the preparation of the image. Through the precise, point-to-point linking of the camera image data and the scan data, a three-dimensional image of the object is thus present which, in addition, also contains color information about the object, or a panoramic image which comprises additional depth information by means of the scan data. By linking the 3D scan panoramic image to a space information, i.e. through the presence of a location reference, a geo-reference is also present.

FIG. 2 shows an example of a 3D scan panoramic image 4. In the example, the panoramic image 4 is stored as what is known as a cube map, i.e. as a cubic representation with six partial images, for example the partial image C1 or D1. The six partial images represent the forward, backward, right hand, left hand, upward and downward view. Alternative examples for image formats or for image maps of this kind are spherical or dome views or projections. The cubic representation here is preferably free from distortion, so that a geometrically correct representation of the scan and image data occurs.

In the example, the 3D scan panoramic image 4 is divided into the color image component C obtained by means of the camera (shown above in FIG. 2) and the 3D component D obtained by scanning (shown below in the figure). The respective cube faces match one another, for example the cube face C1 of the color component and the cube face D1 of the 3D component. The 3D scan panoramic image 4 is here described by four image channels: red, green, blue (C) and depth (D). A 4-channel image format of this sort can be stored and processed with comparatively little effort.

Such a 3D scan panoramic image 4 thus represents an information-rich image of measurement objects, or an information-rich all-round view of a measurement environment that not only makes optical image data available, but also distance data linked precisely to location or to points, whereby a scaling is automatically and immediately given or made available. Such a 3D scan panoramic image 4, or a set of such images, thus represents a very "powerful" reference library which, as described below, is advantageously used for the determination of position and alignment of a scanning surveying device at an unknown, new location or at a new stationing.

Figure 3:
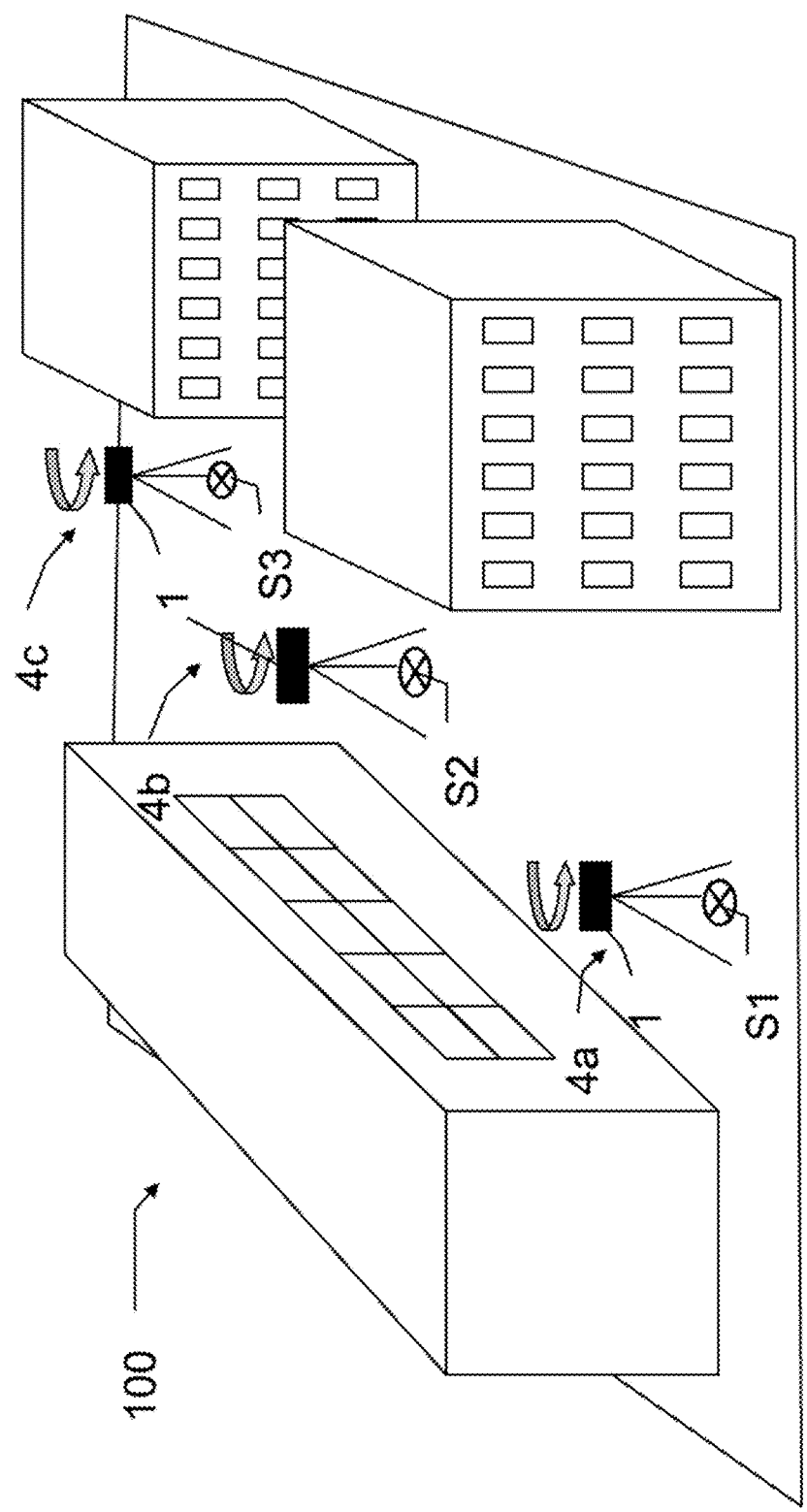
FIG. 3 shows an example for the application of the method according to the first aspect of the invention in a measurement environment.

FIG. 3 shows a measurement environment 100, for example a building complex or a factory grounds. Further examples of such an interrelated surrounding region are industrial facilities such as, for example, refineries or factory halls, a demarcated terrain, or even a single building or a single floor. The building complex 100 is scanned, as described above, from three locations S1-S3, while in each case panoramic images are also recorded with the camera of the laser scanner 1. By linking the respective scan data with the respective panoramic images, 3D scan panoramic images are, as described, generated, so that in the example three 3D scan panoramic images 4a-4c are present which are, for example, stored in a database.

The 3D scan panoramic images 4a-4c here are, moreover, geo-referenced, which means that they are set into relation with an external coordinate system. The coordinate system to which reference is made can be a local system which, for example, is defined by an erection/stationing of the laser scanner 1, or can also be a higher-level global system, e.g. a geodetic coordinate system such as WGS 84. This geo-referencing can take place using methods known from the prior art for a location S1-S3 by scanning a plurality of known reference objects in the measurement environment 100.

A referencing of this sort with the known method is, however, laborious and prone to error. For this reason, in the context of the first aspect of the invention, a method is proposed with which the information obtained with the 3D scan panoramic images and the geo-reference of locations that already exist (reference locations) is optimally exploited in order thus to determine the position and alignment of the laser scanner 1 at a new location or when restationing in a measurement environment 100. This is described with reference to the following figures.

Figure 4:
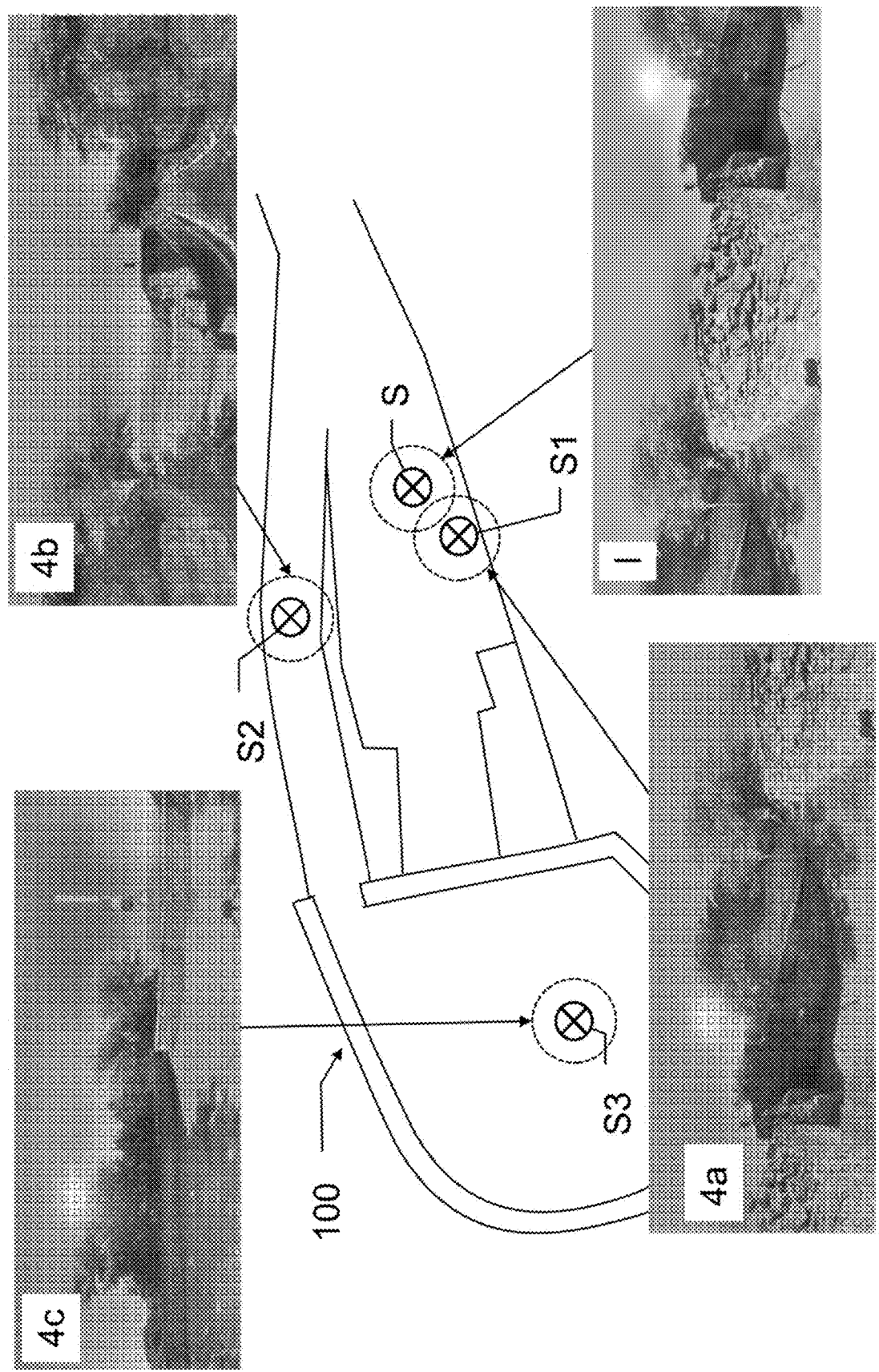
FIG. 4 shows a further example for the application of the method according to the first aspect of the invention in a measurement environment.

FIG. 4 shows a birds-eye view of a measurement environment 100. The three reference locations S1-S3 are to be seen therein, to which the three stored, geo-referenced 3D scan panoramic images 4a-4c belong; these are all-round images (360°), form an image reference set for the measurement environment 100, and can, for example, be called up by the laser scanner from a database by way of WLAN etc. The laser scan is now positioned at the new, yet-to-be determined location S, which is to be used as the stationing for a further scan.

In order to determine the unknown position and alignment of the scanner at the current location S, a 360° panoramic image I is recorded at this position and alignment by means of the device camera. The panoramic image I can be a monochrome image (1-channel) or, by carrying out a scan in situ S1 and combining the scan data with the camera image data, may be a 3D scan panoramic image (RGBD image). As a further alternative, the current panoramic image can be an image which—in contrast to the 3D scan panoramic image—does not cover the full circle, but "only" a large observational or image angle of at least 90° (e.g. 180°), or is present at least in the form of a super-wide angle image, typically with a 92°-122° diagonal image angle, or similar. The camera 2 has, for example, for this purpose an appropriately wide field of view, e.g. by means of a super-wide-angle objective lens or a fish-eye objective lens, or the current image is composed from a plurality of individual images recorded in different view directions.

In the example, however, it is a simple color camera image. (To distinguish the 3D scan images 4a-4c from a simple camera image I, the 3D scan images 4a-4c in the drawing 4 are given a graphic pattern indicating the scan points.) Such a simple, 2D camera image has the advantage of a simple and fast preparation, wherein—as a result of referring to the 3D scan panoramic images 4a-4c as a reference—sufficient information about the current setup for a robust and sufficiently accurate determination of position and alignment is nevertheless made available for the further method steps. In other words, the use of 3D scan panoramic images 4a-4 as a basis for comparison/reference—i.e. of panoramic images with depth information—the effort required to prepare data for comparison (local image or live image), or the requirements on the data that are to be referenced, is largely minimized.

On the basis of image processing methods known per se, or of computer vision algorithms, the current camera image I can be matched to the set of stored 3D scan images 4a-4c.

Figure 5:
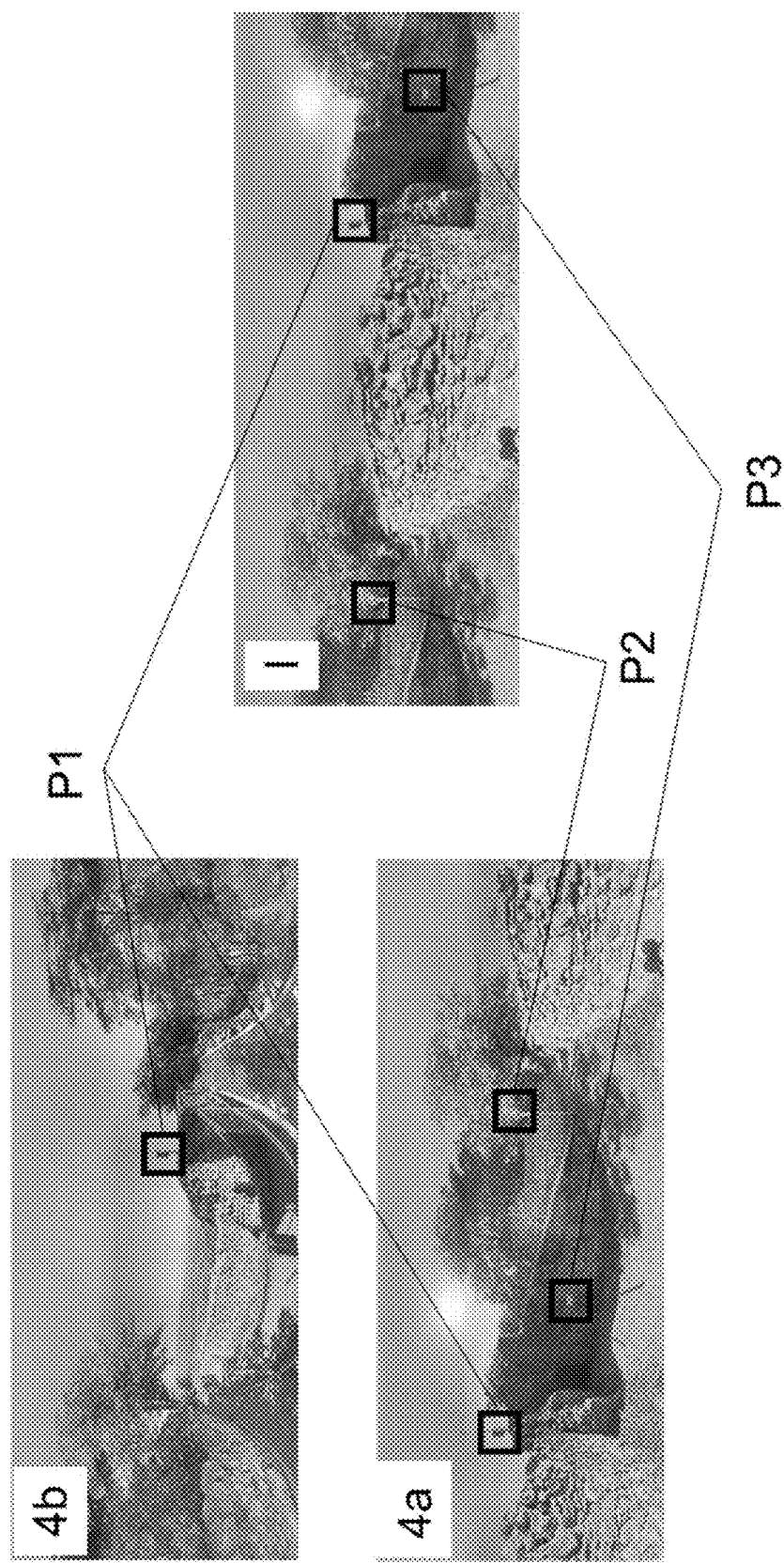
FIG. 5 shows an example of a further flow of a method according to the first aspect of the invention.

As illustrated in FIG. 5, one or a plurality of the stored 3D scan images 4a-4c, comprising corresponding surrounding object points P1, P2, P3, can be identified by the image matching. Matching the 3D scan images 4a-4c to the panoramic image I can, for example, be based on "classic" feature or keypoint matching, in particular through the application of a "bag of words" approach. Alternatively or in addition, machine or deep learning is applied, in particular to discover a latent representation of the image or of the image features, for example an encoding. An image here is the input for a neural network that delivers what is known as an encoding (vector with n elements) as the output. An image similarity is determined on the basis of the difference between the respective vectors/encodings. A match is present in the case of a small difference. As an alternative to this, the image similarity can be determined through the application of what is known as a Siamese network, in which the images are the input and a measure of the similarity results as output.

At least one of the stored images 4a-4c, which is similar to or has corresponding object points P1, P2, P3, is ascertained.

The identification of corresponding points P1, P2, P3 can here be based on feature matching, for example through the application of an SIFT, SURF, ORB and/or FAST algorithm, and/or on a feature encoding based on deep learning.

The said image encoding vectors, or also simplifications/reductions (thumbnails) of the employed images 4a-4c or I optionally constitute the image pool for matching instead of the "original" image files. The use of image representations that have been computationally reduced or simplified has the advantage of a smaller data volume, which enables faster data transmission and/or processing. The smaller data quantity is, for example, used in such a way that the database of 3D scan panoramic images is stored in the form of the small image files in the memory of the surveying device, and the uncompressed reference images (only) in an external memory (so that a relatively small memory capacity on the device itself is sufficient), after which specific individual images that have been matched (on the basis of the small 3D scan panoramic images) are downloaded in the original format/size.

The matching can here also be carried out as a multi-stage process, in that, making use of such images with a low data size, a first selection is made from the stored 3D panoramic images 4a-c, and then the selection of a further matching, in which incorrect matches are rejected, takes place on the basis of the complete, uncompressed 3D panoramic images 4a-c. In other words, a first, rough match takes place with the total quantity of the reduced images to prepare a subset of preselected images, and then a fine match carried out with the "original" images of this subset.

In the example according to FIG. 5, two images 4a, 4b that comprise corresponding object points P1, P2, P3 are identified from the three existing images. If the image matching is carried out, as described above as a possibility, using, for example, image encoding, and corresponding object points P1, P2, P3 are thus not already determined by or for the image matching, a determination of corresponding object points P1, P2, P3 takes place—e.g. by means of feature matching—as an additional step (only) for the images 4a, 4b that have already been determined to be appropriate. If the matches of the images 4a, 4b with the recorded image I are thus found, for example using a Siamese network, corresponding points P1-P3 between the matched images 4a and I or image 4b and I are identified on the basis of feature detection and matching.

The corresponding object points P1-P3 are in any event then used, as described below by way of example, for the calculation of position and alignment at the location S.

Figure 6:
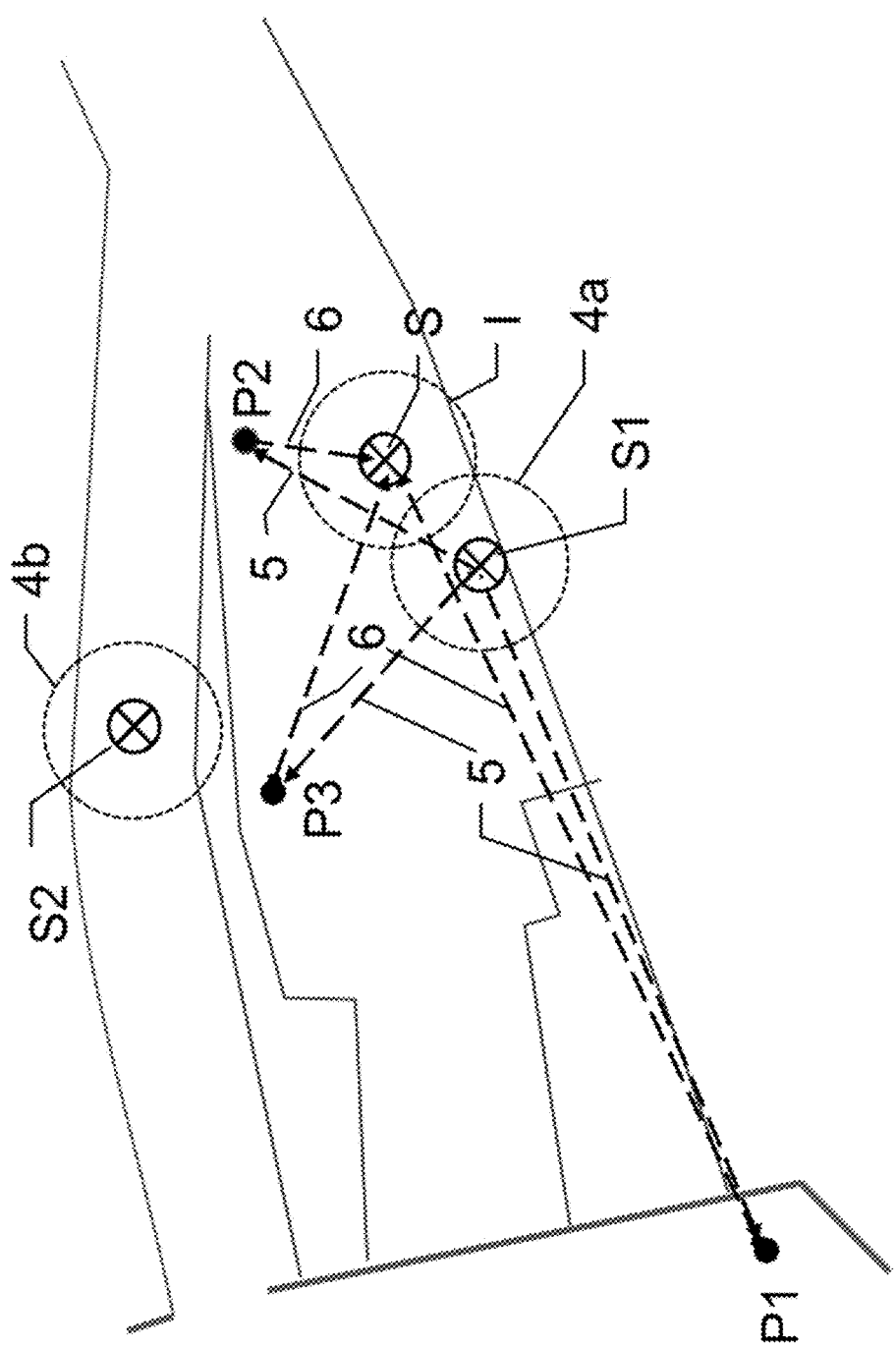
FIG. 6 shows a further example of a further flow of a method according to the first aspect of the invention.

FIG. 6 shows schematically the current location S with the 2D panoramic image I recorded there, and the two reference locations S1 and S2 for which the reference 3D scan panoramic images 4a and 4b are present. Object points P1-P3 corresponding to the current image I are also illustrated, wherein the reference image 4a has three object points P1-P3 corresponding to the current image I, and the reference image 4b has one point P1.

Since the reference images 4a-4c are 3D scan images, the 3D coordinates of all the object points P1-P3 from the respective image data can be determined. For example, the horizontal and vertical angles are calculated from the position of a respective point P1-P3 in the image 4a. Together with the distance value from the depth channel, and taking account of the position and alignment of the image 4a, the (geo-referenced) 3D coordinates (X, Y, Z) of the respective point P1-P3 are then calculated (suggested in FIG. 6 by the arrow 5). Depending on the type of storage of the 3D scan panoramic images 4a, 4b, or in accordance with their type, a determination of the respective geo-referenced 3D point coordinates can alternatively take place, for example also through consulting a table, in which, for example, the 3D coordinates for a respective image point are assigned.

With reference to the geo-referenced 3D point coordinates, and with reference to the image position of the respective (corresponding) points P1-P3 in the current image I, the position and orientation of the laser scanner is then calculated. This calculation is done, for example, through resectioning, as is suggested in FIG. 6 by way of example by the arrow 6.

As is illustrated in FIG. 6, in the example the determination of the position and alignment of the laser scanner or of the location S takes place with reference only to a reference S1, without making use of the second 3D scan image 4b of the further reference location S2 that was also identified. Optionally, in contrast to the illustration, all the identified 3D scan panoramic images 4a, 4b, or the available corresponding points P1-P3 of all the identified reference images 4a, 4b are employed for the calculation of position or orientation, for example up to a defined maximum number.

As a further preferred option, a situational adjustment of the number of 3D scan panoramic images 4a, 4b or references S1, S2 employed for calculation of the location is automatically performed. In the present example, the situation is that the current location S is close to the reference location S1. A comparatively large number of matching points are ascertained in the two matched images I, 4a, for example a hundred or more points, in particular as all-round images from the two locations S, S1 are present. The large number of points, of which three P1-P3 are illustrated by way of example, already permit a robust and accurate calculation of the current position and alignment as points can in particular be selected whose 3D coordinates are markedly different.

An advantage of an automatic adaptation of the quantity of reference data employed for determination of the location to the conditions or requirements is that an optimally adjusted effort is applied. Expressed otherwise, it is thus possible to ensure that a quantity of (process) effort is applied that is as much as necessary and at the same time as little as possible (which is particularly advantageous for mobile devices such as a laser scanner with limited electrical and computing capacity). Precisely as many 3D scan panoramic images as are required in the light of the measurement situation are employed. For example, the method can in this way be adjusted according to whether the position and orientation of the scanner takes place in narrow, convoluted spaces or in open, wide halls or open grounds.

Figure 7:
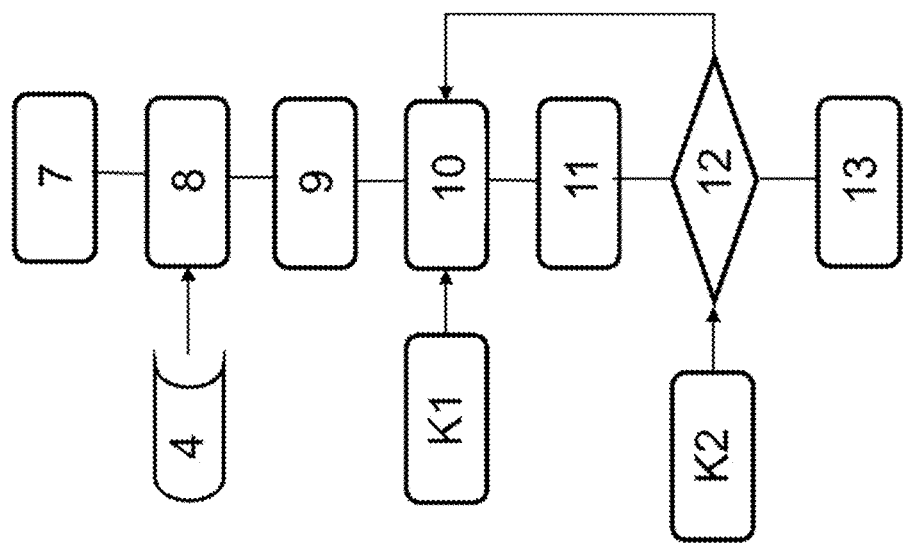
FIG. 7 shows a schematic example of a development of the method according to the first aspect of the invention.

FIG. 7 further explains the method with the automatic adaptation, as described above, of the number of stored 3D scan panoramic images to be employed for the position determination to the current measurement situation.

According to the method, a panoramic image is recorded in Step 7 at the current location, to be determined, with the current position and the current alignment. A matching of this recorded panoramic image to the set of stored 3D scan panoramic images 4 takes place in Step 8, wherein, in the example, a plurality of the stored 3D scan panoramic images that have points or image features that correspond to the recorded image are identified (Step 9).

In Step 10 the number of reference images to be employed for the actual position determination is determined as an adaptation to the concrete measurement situation on the basis of a predetermined first criterion K1.

The criterion K1 is, for example, a measure of the similarity of the current panoramic image with one or a plurality of the stored panoramic images. If, for example, a high degree of similarity is ascertained, the number of reference images to be employed for the determination of the location is kept small, for example restricted to one image. If, on the other hand, a low degree of correspondence is ascertained, a comparatively large number of reference images are employed, for example the maximum available number of matches.

The measure of similarity is, for example, based on the number of corresponding object points in a respective reference image that correspond to the recorded image. Alternatively or in addition, the nature of the corresponding features is employed as a criterion for the determination of the similarity. For example, with reference to image descriptors that describe, for example, the dominant lines in the image, can be employed. A measure of similarity can also be ascertained with reference to properties that describe the respective images as a whole, for example statistical image properties, e.g. grey level or color histograms or gradients or functions of brightness or surface normals. A measure of similarity K1 can further be based on an encoding of the image based on deep learning, or on a measure of similarity determined with a Siamese network.

Such a measure of similarity K1—or, looked at the other way, a measure of difference—can also be a measure for a difference in position between the current location and the reference position. The measure of similarity K1 is then specified in such a way that it is possible with it to classify, at least roughly, whether or not the current location lies close to a (respective) reference location. In the event that they are close, it is then again possible to restrict the number of 3D scan images to be employed; it is, for example, possible to employ only the image (or the associated, identified 3D point coordinates) of the close reference location. If, on the other hand, it is determined with reference to the measure of similarity K1 that no nearby reference location is available, the number of reference images to be employed is set, for example, to 3, 5 or 10.

After the adaptation of the number of reference images in Step 10, the position and alignment of the current stationing are calculated in Step 11 as described above with reference to the 3D coordinates of the object points of the selected reference image or images and their positions in the images, and the method is ended (Step 13; see below for Step 12).

A further example of an adaptation criterion K1 is a property of the location surroundings, i.e. a criterion K1 that describes a character of the measurement environment. The distance to object points is, for example, checked (e.g. the lowest measured distance found, or a mean distance) and a larger number of reference images to employed is set if the distances are large than in the case of small distances. The distances to the scan points or to scan objects can, for example, be an indicator for whether the measurement environment is open grounds or a wide space, in which a relatively high number of identified images is possible or necessary for referencing, or whether it is convoluted grounds or a narrow space in which few images are possible or necessary for referencing. A character of the respective location surroundings can, alternatively or in addition, already be noted in a respective 3D scan panoramic image, and called up directly, for example as metadata.

Distances to object points can also be related to the current location and, for example, after calculation of the current position and alignment, taken into account so that, potentially only after Step 11, an adaptation of the number of reference images takes place if it is ascertained, with reference to the criterion K1, that, in the light of the character of the measurement environment, an optimum result is only possible with an increased number of reference images.

This kind of regulation of the number of reference images that serve for calculation of the location can—as illustrated in FIG. 7—optionally also take place with reference to a further criterion K2. Such a second criterion is, for example, a measure for the precision of the position and or alignment calculated in Step 11. If it is established that the precision does not satisfy the criterion K2 (Step 12) a return is made to Step 10, and the number of images to be used is increased and thereby adjusted. Thus in this option at least one second 3D scan panoramic image is used if necessary. If, as a result of using a further reference location, or further 3D object point coordinates, the current location is determined with sufficient precision, then in Step 13 the location determination method is ended so that, for example, a scan process can then take place automatically from the now known location.

Figure 8:
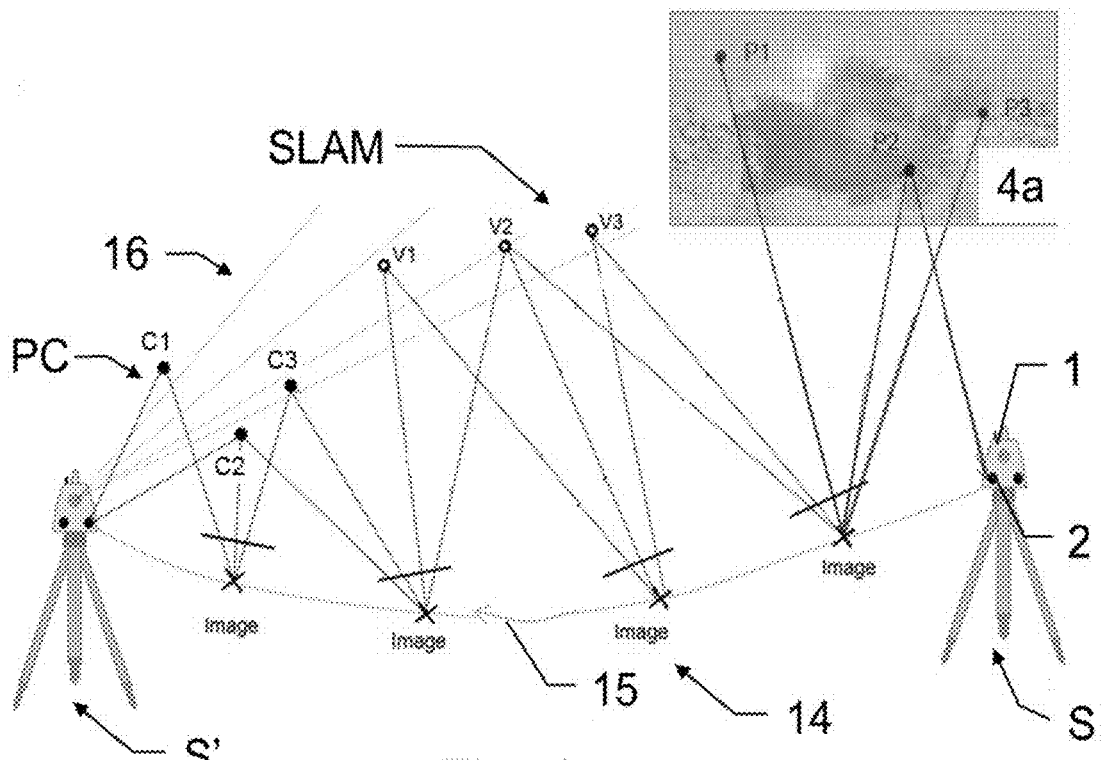
FIG. 8 shows an example of a development of the method according to the first aspect of the invention for registering a point cloud at a further location.

FIG. 8 shows a development of the method according to the first aspect of the invention. In this development a 3D scan panoramic image 4a identified for the location S is used as a starting point on the basis of in order, by means of a SLAM process (Simultaneous Localization And Mapping), to register a point cloud PC at a further location S'. The laser scanner 1 is moved here from the current location S, for which at least one 3D scan panoramic image 4a is identified as described before, along a path (symbolized by the arrow 15) to the further location S'. A series of images 14 is recorded by means of the camera 2 of the surveying device 1, for example by continuously taking photographs or also in the form of a video, along the path 15 to the destination location S'. The 3D scan panoramic image 4a is here integrated as a part of the image series 14. The image data of the image series 14 are processed by means of a SLAM algorithm in a manner known per se in such a way that a spatial interlinking takes place, whereby—beginning from the 3D scan panoramic image 4a as starting image—the last recorded image at the further location S' can finally be spatially related (position and orientation) to the starting image 4a.

As suggested by way of example in FIG. 8, points P1-P3 of the 3D scan panoramic image 4a that are also recognized in the first subsequent camera image are, for example, used for the SLAM process, as well as the points V1-V3 that each correspond in subsequent images as well as, finally, the points C1-C3.

These last-mentioned points C1-C3 have, in addition to correspondences within the image series 14, also correspondences in the point cloud PC that is recorded—in addition to the camera image—by means of scanning at the location S' (symbolized by the strokes 16). The point cloud PC can thus finally be set in spatial relationship with the 3D scan panoramic image 4a, or registered relative to this image.

The fact that a camera image and a 3D point cloud are simultaneously present and linked to a 3D scan panoramic image 4a is thus advantageous for the registration of two point clouds, in that the camera image is used in a SLAM process as the first "pylon" of a "bridge" (image series 14) with which the new point cloud PC can be linked to the known 3D point cloud of the 3D scan panoramic image 4a prepared by some past scan.

The correspondences between the images of the image series 14, including the 3D scan panoramic image 4a, are for example determined here by means of feature matching. The assignment of the points C1-C3 of the point cloud PC to the camera image of the last image of the image series (the camera image of the location S') can on the other hand also be done "more simply" without image matching if a calibration of the camera 2 to the scanning module of the surveying device 1 is present, which is normally the case.

It is clear that these illustrated figures only illustrate possible exemplary embodiments schematically. The different approaches can, according to the first aspect of the invention, equally well be combined together as well as with devices and methods from the prior art.

Figure 9:
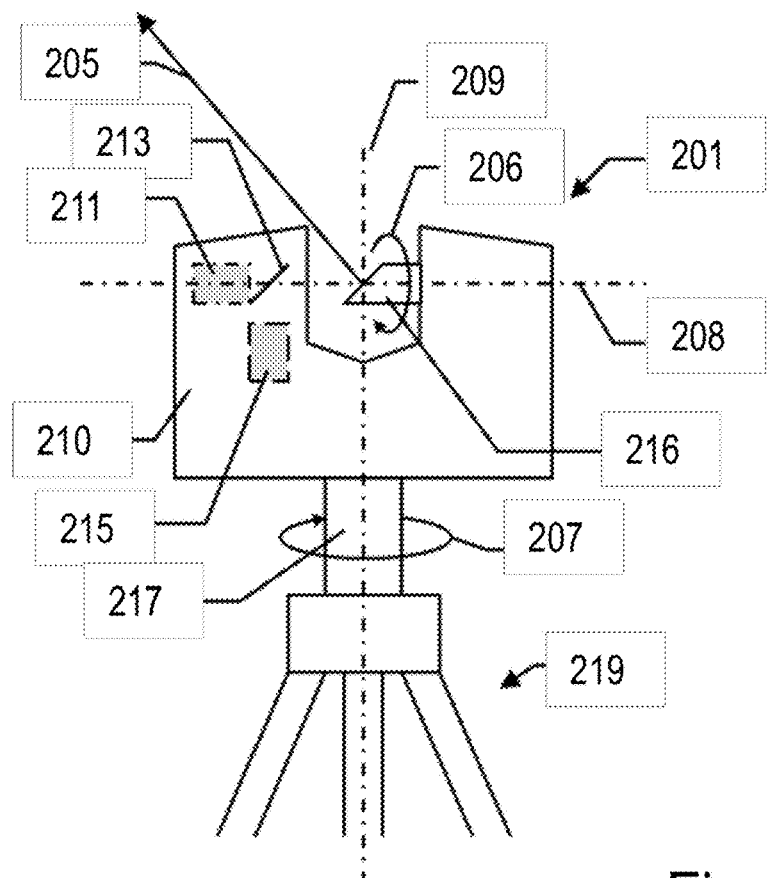
FIG. 9 illustrates an exemplary embodiment of a generic terrestrial optoelectronic coordinate measuring device, embodied as a laser scanner.

FIG. 9 shows an exemplary embodiment of a generic terrestrial optoelectronic coordinate measuring device, embodied as a laser scanner 201 in the example. The latter has an upper part 10, which is connected to a base 217 so as to be rotatable in motor-driven fashion about a vertical axis 209, said base being disposed on a tripod 219 in this example. The upper part 210 contains the light transmitter 211 for emitting a measuring beam 205 of the laser scanner, a light receiver 215 for receiving backscattered components of the measuring beam 205 and a beam splitter 213. A beam steering unit 216, which has a mirror, is attached to the upper part 210 so as to be rotatable in motor-driven fashion about a transverse axis 208. The transverse axis 208 is orthogonal to the vertical axis 209. By rotating 206 the beam steering unit 216 about the transverse axis 208, the measuring beam 205 is guided in vertical fashion over a surface while the measuring beam 205 is guided horizontally over the surface by rotating 207 the entire upper part 210 about the vertical axis 209.

A control and evaluation unit (not shown here) is data-connected to the light transmitter 211 and the light receiver 215 in the upper part 210, wherein the control and evaluation unit, or parts of the same, may also be disposed outside of the upper part 210, for example as a computer connected to the base 217. The control and evaluation unit is embodied to ascertain, for a multiplicity of measurement points, the distance between the laser scanner 201 and the test object from the time-of-flight of the measuring beam 205 and its back-scattered components. To this end, it is also possible, for example, to determine and evaluate the phase shift between the emitted measuring beam 205 and the received radiation. An indication apparatus (not illustrated here), which can be configured as a display directly on the laser scanner 201 or as a display of a connected computer, can be connected to the control and evaluation unit.

The embodiment of the surveying device 201, shown here, for determining object point coordinates is purely exemplary and possible modifications are known from the prior art. A total station or an electronic tachymeter, with which individual point measurements are performable, e.g., within the scope of geodetic surveying, are further examples of such a device.

Figure 10:
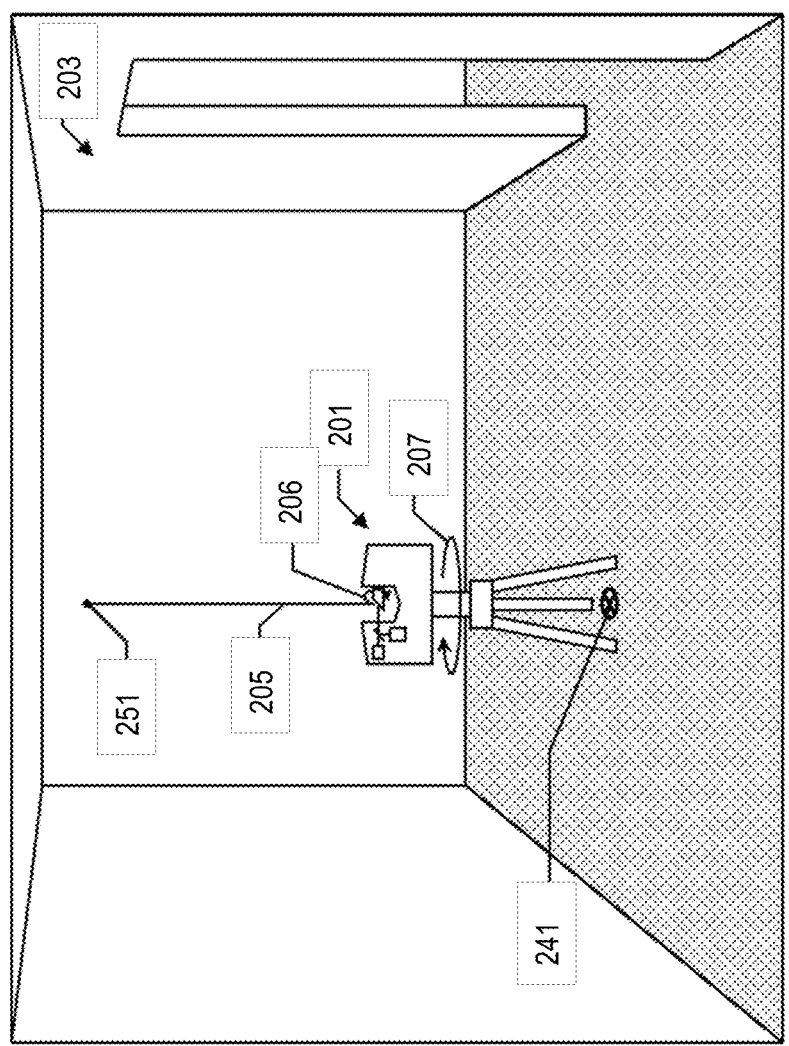
FIG. 10 illustrates a laser scanner when surveying an interior from a first measurement position,
FIG. 11 *a-e* illustrate a first example of a method progression according to the second aspect of the invention.

FIG. 10 shows the first embodiment of the laser scanner 201 when surveying measurement surroundings, embodied as an interior 203, from a first measurement position or setup location 241.

By means of the (fast) rotation 206 of the beam steering unit, the surfaces of the measurement surroundings 203 are scanned by the measuring beam 205 along a vertical circumference. By means of the (slow) rotation 207 of the upper part relative to the base, these circumferences successively scan the entire room. The totality of the measurement points 251 of such a measurement is referred to as the scan and may yield a point cloud, for example.

In addition to the ascertained distance from the laser scanner 201 (or from the origin of the reference system), each measurement point 251 may still have a brightness value, which is likewise ascertained by the control and evaluation unit. The brightness is a greyscale value which is ascertained, for example, by integrating the band-pass-filtered and amplified signal of the light receiver 215 over a measuring period assigned to the measurement point 251.

Optionally, images that allow additional colour values to be assigned to the measurement points 251 can also additionally be generated by means of a colour camera of the coordinate measuring device 201. By way of example, such a camera can be embodied as an overview camera. Moreover, such surveying devices 201 with one or more cameras are also known, said cameras allowing panoramic images of the measurement surroundings 203 to be recorded.

The optical scanning and surveying of the surroundings by means of the laser scanner 201 in each case creates a scan of a certain recording object or, phrased more generally, object points 251 are measured in coordinative fashion. Here, there often are recording objects or measurement surroundings 203 that cannot be captured by a single scan or from a single location 241, for example angled interiors or a plurality of rooms of a building. For the surveying thereof, a user is assisted by the method according to the second aspect of the invention, as described on the basis of the following figures, by virtue of positions being automatically checked for the suitability thereof for a setup location.

FIGS. 11a-11e illustrate, in the form of an outline, an arrangement of a plurality of rooms 203a-203d as an exemplary recording object 203. These measurement surroundings should be surveyed in the entirety thereof.

Figure 11A:
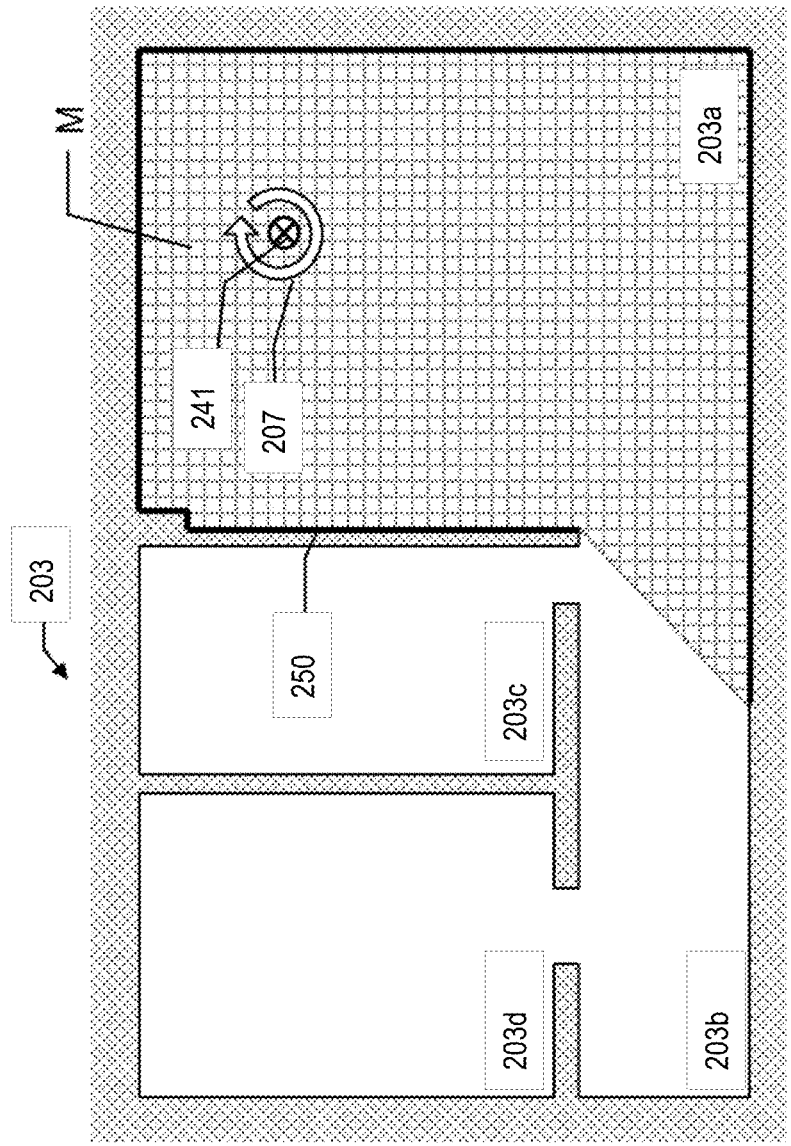

To this end, the laser scanner should be set up at different setup locations, with the first setup location 241 being illustrated in FIG. 11a. The origin of the reference system of the laser scanner, fixed to the device, thus reaches a plurality of different centres of the laser scanner, fixed to the room. Then, the various scans should be categorized in a common coordinate system, for example as a so-called registration.

For such a registration, a certain amount of overlap between the measurement regions or point clouds is advantageous or necessary.

In FIG. 11a, the laser scanner is set up at a first measurement position 241 in one of the rooms. As a result of the fast vertical rotation of the beam steering unit and the slow horizontal rotation 207 of the upper part relative to the base, the surfaces 250, i.e., walls, floor and ceiling (indicated in the figure by the thick black lines), of the first part of the measurement surroundings 3 are successively scanned as first measurement region M (grey hatched area), wherein a first point cloud may arise as a result.

In FIG. 11b, the laser scanner is moved along the path 204 from the first measurement position 241 to a first position P1 for the purposes of changing the setup location. Here, for example within the scope of a setup location ascertainment functionality of the laser scanner, measurement surroundings 203 are optically captured from the first position P1, in the example by recording 240 a panoramic image or a 360° surround photograph, for the purposes of which, for example, a camera of the laser scanner is panned by rotating the scanner upper part, symbolized by the arrow 207a. Alternatively, such a capture is implemented optically, e.g., by an (approximate) lidar scan.

For a simpler illustration, measurement surroundings 203 are captured only at the position P1 in this example; however, within the scope of the method, measurement surroundings are captured continuously along the path 204 within the scope of changing the setup location, starting from the measurement position 241, for example by continuously carrying out photography at a certain recording rate or continuously profiling with the laser beam of the laser scanner. The evaluation or analysis of the measurement surroundings data captured thus, described below, is preferably carried out continuously such that a multiplicity of positions are checked for the suitability thereof for a setup location or the respective current position is continuously monitored for a suitability.

FIG. 11c illustrates how the captured measurement surroundings data are now evaluated in order to check the position P for the suitability thereof for a setup location. A task region O (dotted portion) is ascertained on the basis of the captured measurement surroundings data. This is understood to be a surroundings region which should be surveyed, i.e., scanned, for example. In the example, this is already scanned measurement region M (chequered portion) and the access region 203b to the two smaller rooms 3c, 3d. Thus, the measurement region M can be considered to be a partial region or subset of the task region O.

Further, a visual range V is ascertained on the basis of the captured measurement surroundings data. This is understood to mean the part of the measurement surroundings that is visible or surveyable from the position P1. In the example, both the large room 203a and the access region 203b are visible from the position P1 or, expressed differently, the visible range V is congruent with the task region O. Expressed mathematically, the visual range V and the task region O are identical.

Since the visual range V from the position P1 entirely comprises the (previously ascertained) task region O (or the task region O is at least a subset of the visual range V), the check yields the current position P1 of the coordinate measuring device to be suitable for a setup location. That is to say, the laser scanner can or could be set up at the present location in order to survey further parts of the measurement surroundings M or, expressed differently, to scan a further measurement region.

However, in the example, the user and the device continue their movement without surveying (FIG. 11d) and reach position P2. A further capture of measurement surroundings 203 is implemented from this position P2. A further task region O arises from the captured surroundings data or rather, as illustrated, the task region O is updated (in this case: expanded); now, it comprises the access region to the rooms and part of one of the two small rooms.

Further, the visual range V is once again ascertained. In the example, the task region O is not completely contained within the visual range V; a part $\overline{V1}$ of the task region O is not visible or capturable from the position P2. However, this part $\overline{V1}$ which is "invisible" from the current position P2 is a constituent part of the measurement region M, and consequently already surveyed.

The comparative analysis checking the position P2 thus yields that the task region O is not completely contained within the visual range V, i.e., part of the task region O is not visible from the location P2. However, this is classified as unproblematic since this region of the measurement surroundings has already been scanned, i.e., the invisible region $\overline{V1}$ is a subset of M. Moreover, there is a (sufficiently large) overlap region between the visual range V and the measurement region M (in the example according to FIG. 11d, the overlap region corresponds to the entire measurement region, reduced by the "invisible" part $\overline{V1}$). As a result of this intersection, a second measurement region recorded from the location P2 can be connected (with sufficient accuracy/robustness) to the first measurement region; i.e., for example, a second 3D point cloud of the second measurement region can be registered in the coordinate system of the one first 3D point cloud of the first measurement region M.

Consequently, the position P2 is also suitable for a setup location. A second measurement region surveyed from that point will or would guarantee a gap-free connection to the first measurement region M with, moreover, a sufficient overlap.

Figure 11D:
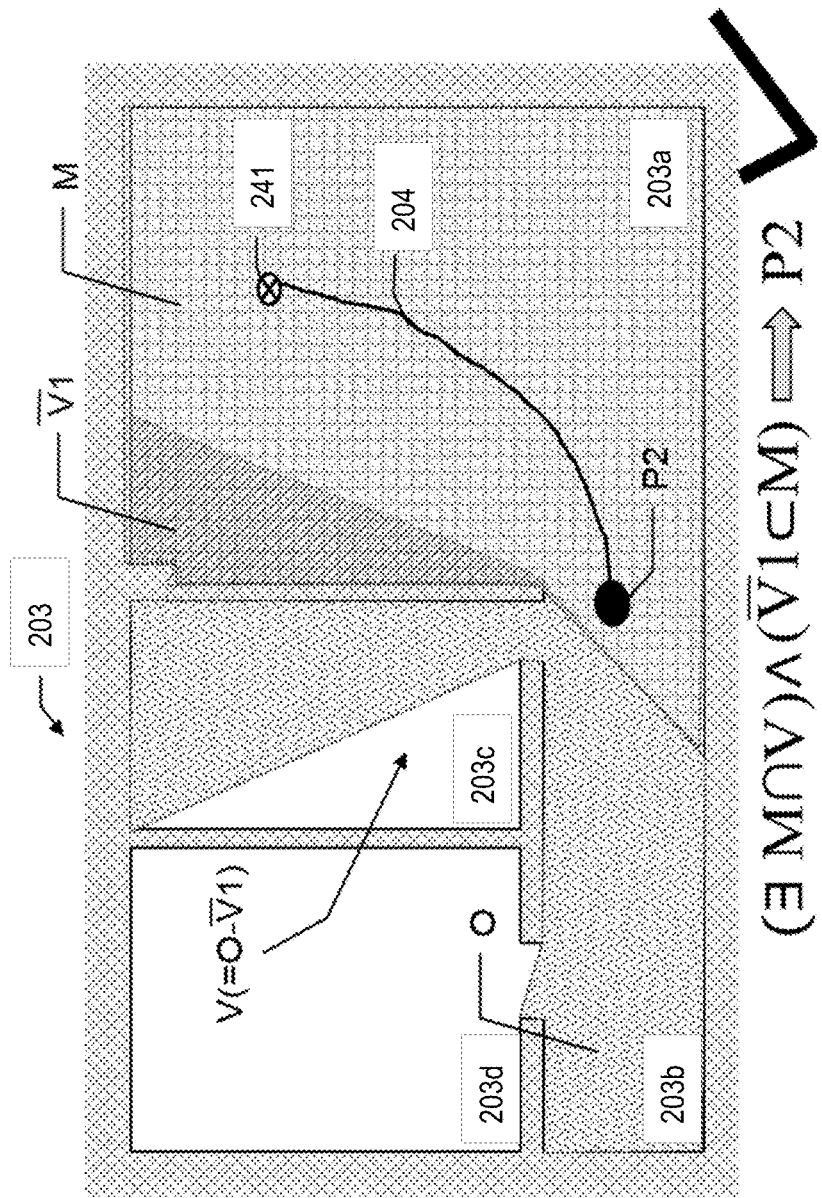
Figure 11E:
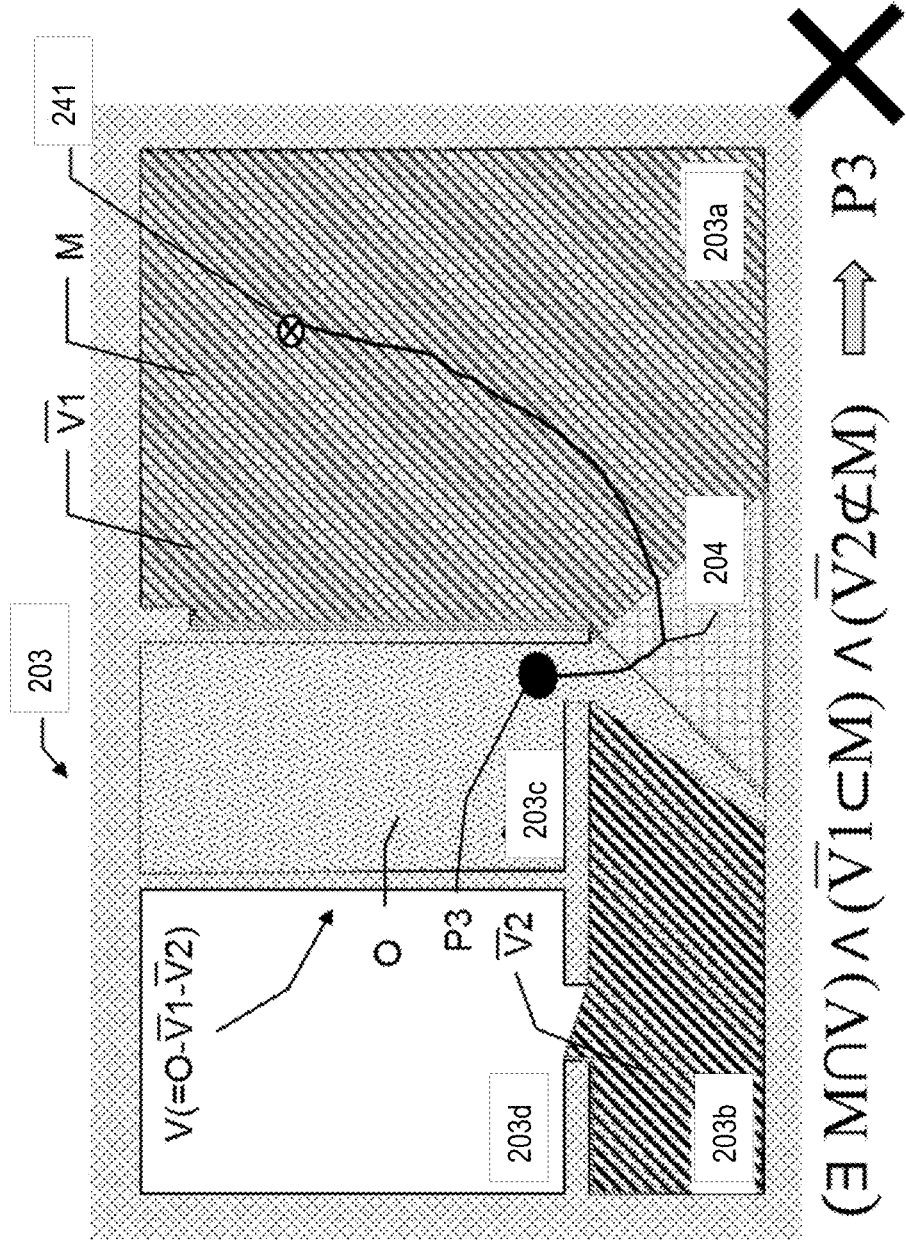

FIG. 11e illustrates how the coordinate measuring device has continued its path 204 and has now arrived at the third position P3 in the one small room 203c. The task region O is updated on the basis of the optical recording—a photographic recording in the example—of the measurement surroundings. In the example, it is ascertained that the surfaces of the room 203c have been added to the measurement task and should be scanned.

In the example, the overlap zone with the measurement region M is significantly smaller than in the example according to FIG. 11d (in the drawing, the freely visible chequered triangle at the left lower edge of the measurement region M); however, the visual range V still ensures a sufficient connection to the measurement region M. Therefore, a suitability condition is also fulfilled in the position P3. Further, as previously (cf. FIG. 11d), the no longer visible region $\overline{V1}$ is unproblematic as it has already been measured (subset of the first measurement region M).

However, the evaluation of the captured measurement surroundings data yields that, from the third position P3, the task region O is no longer completely surveyable or else has not already been surveyed. There is a portion $\overline{V2}$ of the task region O which is not visible and which is not a subset of the already surveyed measurement region M. Thus, proceeding from the position P3, there is a region of the measurement surroundings that has not yet been surveyed and is identified as needing to be surveyed but is not surveyable from the position P3.

Thus, it is automatically determined that there is a region $\overline{V2}$ of the measurement surroundings 203 that is part of the task region O but neither part of the already scanned measurement region M nor part of the visual range V.

Consequently, a necessary condition for the suitability for setup location is not given at the third position P3. Consequently, the check overall is negative; the position P3 is unsuitable (at least for a next setup location; as described further below, the checking method according to the second aspect of the invention can be further refined in order to facilitate gradations between the two poles of suitable-unsuitable).

The analysis result of an unsuitable position P3 (for the next setup location) is indicated, for example, to the user moving the measuring device, e.g., by an acoustic or optical warning such that said user can react accordingly. Thus, on the basis of an analysis of regions to be surveyed, regions that already have been surveyed and regions that could be surveyed from the current position, possibly present missing or uncovered regions are automatically ascertained by the method according to the second aspect of the invention and, e.g., visualized on the basis of a graphical overview representation/visual map of the measurement surroundings on a tablet or the like such that the user, e.g., while changing position for adopting a next or further setup location, can be informed accordingly.

During continuous checking of the current position along the path 204, the user is, e.g., provided with information about the setup location suitability on the basis of a luminous display, e.g., in the form of an LED which shines in green for as long as suitability for setup location is present and which switches to red as soon as the check yields the current position is unsuitable for a survey or unsuitable as a next setup location. As an alternative or in addition thereto, a warning sound is output when an unsuitable location is reached.

As an alternative or in addition thereto, such a suitability check is implemented in graded fashion and, accordingly, such optional user information is too. By way of example, such an LED shines orange if the current position only has restricted suitability for setup location (not necessarily unsuitable or unsuitable in any case).

In relation to the example according to FIG. 11e, it is possible to automatically identify that scanning from the position P3 initially leads to the gap $\overline{V2}$, but this gap $\overline{V2}$ can be closed by continuing the path 4 and deploying at a further position along the continuation of the path to/in the room 3b (i.e., the gap $\overline{V2}$ can be remedied in future, as it were). In such a development, the two ordering categories suitable-unsuitable are additionally differentiated to include positions which are suitable for a setup location if (at least) one further setup location is added when the surveying is continued.

By contrast, the measuring system would output a "red" warning in the case of a "backward-facing" gap, i.e., a gap remaining unfilled when continuing the path 204; by way of example, if the user were to leave the room 203c and proceeded to the room 203b without having surveyed (the room 203c) from the position P3, such a warning would be output since the room 203c then remains non-surveyed as part of the task region O. Thus, whether a position leaves behind parts of the surroundings to be surveyed or from which position a measurement gap which will no longer be filled in future remains and/or from which position there is no sufficient overlap to an already present measurement region M, which will no longer be able to be established in future either, is checked.

In the case of the aforementioned embodiment with a map-based visualization of the measurement surroundings or of the task region, visual range and/or measurement region (e.g., from a bird's eye view), such warnings or user information can also be presented graphically. By way of example, positions (or position zones) suitable for setup location in any case are marked in green, occasionally suitable positions or positions with only restricted suitability are marked in orange and certainly unsuitable positions are marked in red. Additionally, potentially problematic surroundings regions (possible measurement gaps) can be indicated graphically and, e.g., with colour gradation in addition thereto or instead of this. Consequently, (particularly) suitable and/or potentially problematic locations are automatically indicated to the user on the basis of such an overview representation. Consequently, such a visualization can represent a basis for a plan or type of navigation aid, on the basis of which the user can optimally plan the survey of the task region O, e.g., in view of a gap-free or metrological coverage of the task region O with the fewest possible and/or optimally overlapping measurement regions/setup locations, or with an optimal route 204. Such optimization criteria can thus be taken into account in a development of the method (which is independent of such a visualization) in order to further refine the position check. Examples of optimization criteria which can be predetermined include the complete survey of measurement surroundings 203 with a minimum time expenditure, minimum number of setup locations, optimal scan resolution (e.g., maximal or sufficiently high) or high geometric accuracy/correspondence of the setup locations with respect to one another. If a plurality of such optimization criteria are considered, these may partly contradict one another. In such cases, there can be an automatic assessment such that, in a type of compromise, optimal positions which satisfy the chosen criteria to the best possible extent are ascertained automatically, wherein, for example, a weighting of the individual criteria may also be specified by the user.

Here, such a procedure is implemented, in particular, with incremental or dynamic adaptation such that the user need not necessarily or rigidly follow a plan set up once and a visualization is accordingly continuously updated, e.g., at the respective location or path 204 or in each case following the recording of a further measurement region.

Figure 12A:
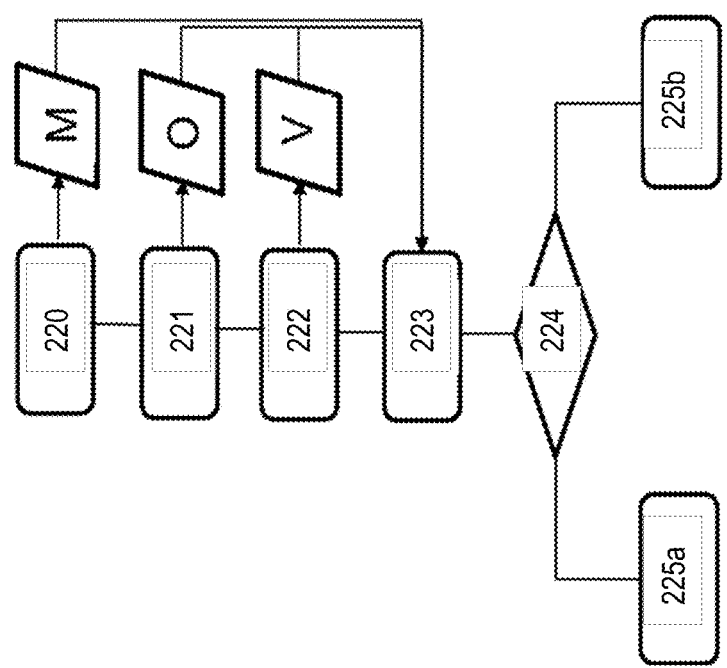
FIG. 12*a-b* illustrate further examples of an automatic position suitability ascertainment method according to the second aspect of the invention.
Figure 12B:
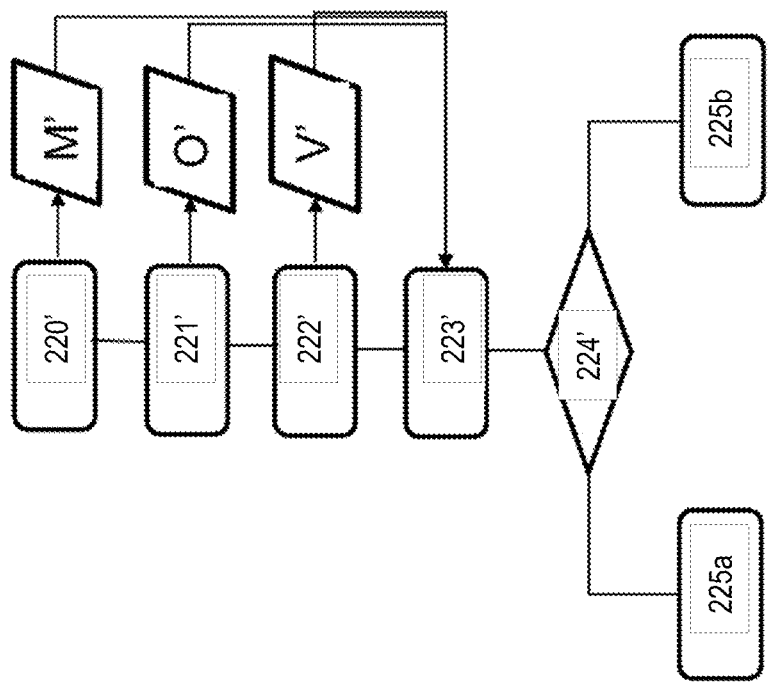

FIGS. 12a and 12b illustrate further examples of a position suitability ascertainment method according to the second aspect of the invention.

According to the method procedure as per FIG. 12a, a first object scan is carried out at a first setup location in a first step 220 by means of a terrestrial coordinate measuring device with one or more scanning means for scanning surfaces, as a result of which a first measurement region M is generated as first data.

The device is moved in the measurement surroundings in step 221 and regions of the measurement surroundings to be surveyed, e.g., walls, ceilings, floors, etc., are automatically captured by means of scanning means. By way of example, the capture is performed by virtue of the laser beam of a scanning means being rotated about two axes (a faster and a slower axis of rotation) and scanning surfaces at a lower resolution (a substantially lower resolution than the resolution during the survey). As a result, a task region O is generated, which continuously grows on account of sweeping over ever new surroundings/object areas with the measuring beam.

While moving, ranges V are automatically captured in step 222 by scanning means, which may—but need not—be the same as those capturing the task region, said ranges representing the respectively visible range of the measurement surroundings, i.e., the surroundings zone visible or measurable from the currently present position. By way of example, the range V is a subset or partial set of the task region O, which results from the most recent 180° rotation of the slow axis of rotation.

An automatic combined analysis is performed in step 223 on the basis of the data from the measurement region M, the task region O and the visual range V, with points being examined for correspondence between the regions M, O and V. Here, the distance between the points and the scanning resolution are taken into account when assigning a correspondence between two points, e.g., a point from the visual range V and one from the task region O. By way of example, a lack of point correspondence is determined if, in the case of a scanning resolution of 20 cm, there is no nearest point within 20 cm from a point of the region/range M, V or O in another region/range V, O or M.

Optionally, normal vectors for the respective points can be calculated and taken into account in the analysis in respect of point correspondences. To this end, a neighborhood set is determined for example, said neighborhood set representing mutually adjacent object points of a respective region or coarse scan. By way of example, neighbouring object points are two object points with the shortest distance from one another in each case or all object points with a distance from an object point below a certain threshold or a certain number of object points that have the shortest distance from a selected object point, i.e., for example, three object points with the three smallest distances. Object surfaces and their associated surface normals are estimated on the basis of the neighborhood set, i.e., a type of real-time geometry identification is performed, for example by virtue of a mathematical plane being placed through all points of a neighborhood set or by way of any other approximation method. By way of example, the surface is ascertained by fitting a plane on the basis of a plurality of object points using mathematical processes known to a person skilled in the art. Finally, the surface normal of the plane is calculated. Should the surface be estimated not by determining a mathematically exact plane but by any other type of modelling, the surface normal is, for example, a mean value of a plurality of individual surface normals. A point correspondence is assumed if both the distance between the points of two surroundings regions is small (or lies below a defined threshold) and the normal vectors thereof point at least substantially in the same direction. Consequently, it is possible to avoid, for example, an incorrect assignment of a point correspondence to points on the opposite side of the (thin) wall, which, although they have a small distance from one another (approximately the wall thickness), have opposite normal vectors.

The result 224 of the ascertainment of point correspondences is used to automatically determine whether a sufficient number of point correspondences is present (225a), i.e., whether there is a connection or overlap of measurement region M, task region O and visual range V at the respective device position, or whether there are points from the task region O which have no correspondence in either the measurement region M or the visual range V, i.e., whether an uncovered region is present (225b). The device position is graded suitable for a setup location in the first case (225a); it is graded unsuitable in the second case (225b).

FIG. 12b shows a further method progression. According to this method example, individual point measurements are carried out (a set of individual object points are surveyed) at a first setup location in a first step 220' by means of a terrestrial coordinate measuring device, e.g., a total station, as a result of which a first measurement region M' is generated as first data.

The device is moved in the measurement surroundings in step 221' and regions of the measurement surroundings to be surveyed, e.g., walls, ceilings, floors, etc., are automatically captured by means of camera means. By way of example, the capture is performed by virtue of panoramic images being recorded continuously by a camera with a large field of view and/or a rotation of a camera, with the camera being integrated in the housing of the total station, for example. This generates a task region O'.

Here, object points relevant to the surveying task or belonging to objects to be surveyed, e.g., fire hydrants, manhole covers and the like, are automatically detected within the scope of the creation of the task region O' by means of an object recognition algorithm based on computer vision and/or machine learning, e.g., deep learning.

Then, the task region is represented by a list of object points, e.g., as feature vectors, which continuously increases by virtue of, within the scope of the movement of the surveying device, new objects continuously appearing in the visual range of the camera and being identified as surveying objects to be recorded.

In step 222', one or more cameras of the surveying device, which may—but need not—be the same as those capturing the task region, automatically capture ranges V', for example by means of panoramic photography, said ranges representing the respectively visible range of the measurement surroundings, i.e., the surroundings zone visible or measurable from the currently present position. Here, in the same way as when creating the task region, work can be carried out with object recognition. By way of example, the visual range V' is a subset of the task region O', which is detected in the respective current panoramic image belonging to the current device position.

A comparative analysis is performed automatically in step 223 on the basis of the data from the measurement region M', the task region O' and the visual range V', with points being examined for correspondence between the regions M', O' and V'. Here, there is an assignment of a correspondence, for example by means of feature matching or feature tracking.

The result 224' of the ascertainment of point correspondences is used to automatically determine whether a sufficient number of point correspondences is present (225a), i.e., whether there is a connection or overlap of measurement region M', task region O' and visual range V' at the respective device position, or whether there are points from the task region O' which have no correspondence in either the measurement region M' or the visual range V', i.e., whether an uncovered region, and hence a position unsuitable for a (next) setup location, is present (225b).

Figure 13A:
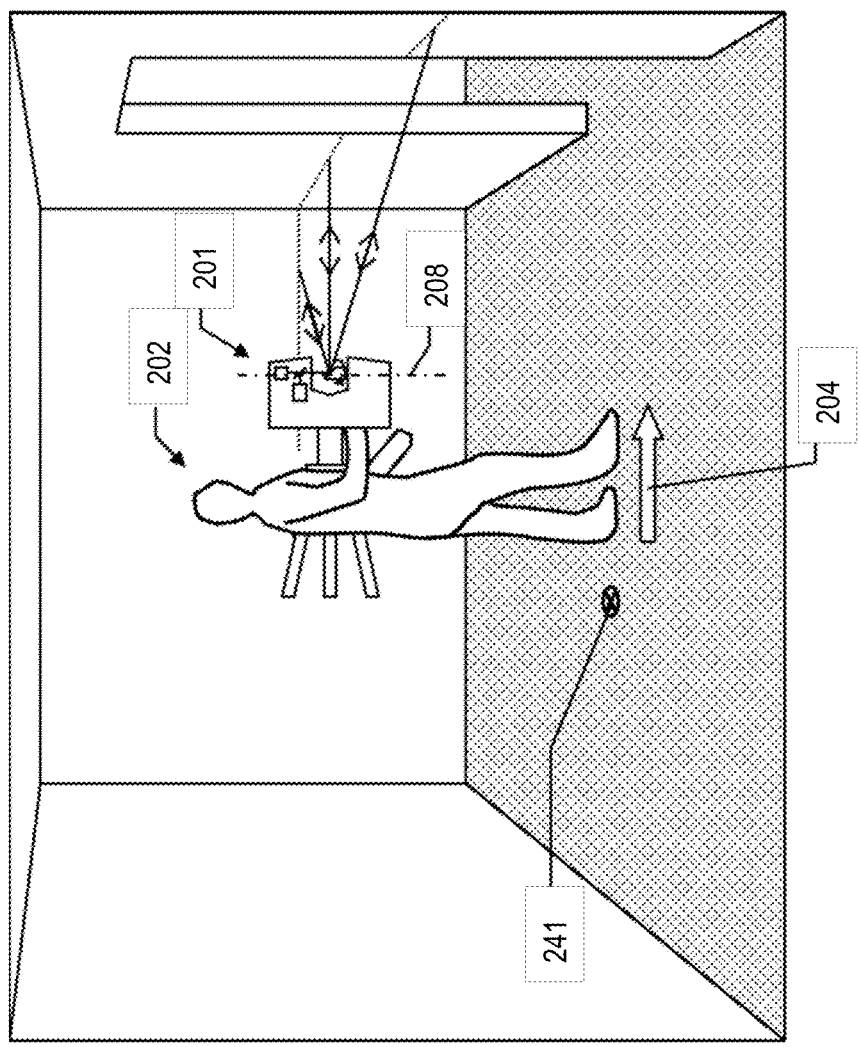
FIG. 13*a-b* illustrate an example for capturing measurement surroundings for checking a setup location.
Figure 13B:
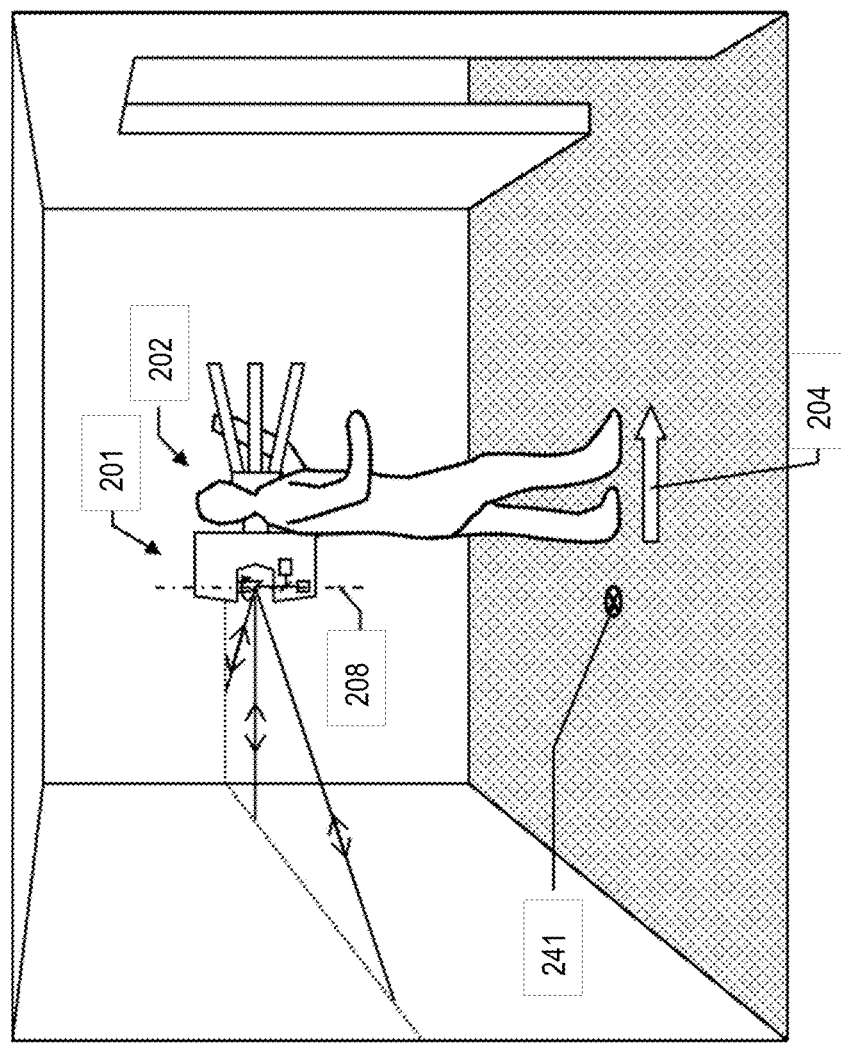

FIGS. 13a and 13b illustrate an example for capturing measurement surroundings for checking a setup location. Following the survey of the measurement surroundings from the first setup location 241, a user 202 initiates a setup location ascertainment functionality on the laser scanner 201 and picks up the laser scanner 201 from the base or the tripod, tilting the laser scanner 201 through approximately 90°, as illustrated, such that the transverse axis 208 (the axis about which the beam steering unit is rotatable in relation to the upper part) now extends substantially vertically or at least approximately follows the direction of gravitational acceleration.

Then, the user 202 moves the laser scanner 201 in this hold while the laser scanner 201 automatically captures in each case the currently visible measurement surroundings/ measurement surroundings accessible to the measuring beam as a visual range and records the path 204 traveled. This is implemented in a profiler mode of the laser scanner 201. The latter is characterized in that the slow rotation of the upper part about the base is deactivated and consequently measurement points are only surveyed in one plane. The user tilting the laser scanner 201 through 90° renders a profile of the surroundings traversed along the path 204 capturable, i.e., in particular, renders an outline recordable, by means of SLAM (simultaneous localization and mapping) or lidar-SLAM, from which measurement surrounding points (task regions) to be surveyed can be derived. Thus, using this arrangement, it is possible to record, e.g., a horizontal profile of the room (outline) as a task region, which is continually expanded by moving the scanner through the room. For scanning tasks, such measurement surrounding points are, e.g., walls, ceilings, floors, buildings, vegetation, etc. For individual point surveying tasks, e.g., within the scope of geodetic surveying, task points are a set of surface points to be surveyed, such as the corners of the house, the centre of a manhole cover, etc.

Preferably, means for stabilizing the scanner 201 are present in the profiler mode in order to keep the scanning plane as horizontal as possible during the movement. Here, the horizontal orientation of the scanner 201 can be optimized by means of both active and passive stabilization.

By way of example, designing the upper part such that the centre of gravity of the upper part is chosen in such a way that the transverse axis 208 independently moves to be perpendicular when the upper part, as illustrated, is tilted through approximately 90° is a possible means for passive stabilization. In order to ensure this, a free rotatability of the upper part about the vertical axis must be ensured.

For active stabilization, the transverse axis 208 can also be automatically rotatable in the direction of gravitational acceleration within the scope of the position testing functionality, in particular by way of a motor-based rotation of the upper part in relation to the base. For the purposes of ascertaining the direction the gravitational acceleration, the laser scanner 201 may have one or more inertial measurement units (IMUs), at least one of which is preferably housed in the upper part. Inclinations of the profiler plane with respect to the horizontal can be compensated with the aid of an inertial measurement unit in the upper part. By way of example, an inertial measurement unit is provided in the upper part and configured to ascertain an inclination of the transverse axis relative to the direction of the gravitational acceleration. Here, the laser scanner is preferably configured—depending on the ascertained inclination—to rotate the upper part in motor-driven fashion in relation to the base in such way about the vertical axis or in relation to a holding apparatus about a stabilized axis in such a way that the inclination of the transverse axis relative to the direction of gravitational acceleration is minimized. As an alternative or in addition thereto, an IMU or comparable sensors, e.g., a compass, can be used to assist the recording of the path or as an alternative to the use of SLAM.

Optionally, both the measurement rate and the rotational speed of the axis of rotation are reduced (in comparison with the actual survey of the measurement surroundings) in order to save power. By way of example, surfaces are scanned with a reduced or coarse point density of 10 cm (in relation to an object distance of a few metres, e.g., 5 m).

Optionally, the scanner can also oscillate or rotate about the vertical axis during profiling. Instead of a plane of the room, a segment (or the entire room) is scanned in that case and can be used for a mobile mapping. Thus, a part of the side walls of the room is scanned in the case of slight oscillation of the vertical axis (for example by approximately ±5°). Thus, there still is a large enough overlap region available should there be a change of the height of the device.

As an alternative to such measuring beam-based the means for capturing measurement surroundings and deriving a task region and/or a visual range, these means are, as already mentioned above, embodied as a camera, e.g., as a panoramic camera, depth camera, stereo camera, RIM camera or the like. In addition to a scanner, a panoramic or dome camera is a preferred means for ascertaining the visual range. The camera alternatives are used, in particular, in surveying devices such as total stations that are provided for individual point surveying.

Preferably, or if both camera and profiler/scanning unit are present, both such camera means and measuring beam means are used to create the task region.

Optionally, object recognition algorithms are used when capturing the measurement surroundings or ascertaining the task region. Object recognition is used to identify objects, e.g., objects of particular interest such as doors, windows, buildings, etc., with the object recognition optionally being based on machine learning. In the process, it is also possible to classify objects that are identified but should not be surveyed, for example because they are not a permanent constituent part of the measurement surroundings (e.g., vehicles) or because they are of little interest. Then, these objects are not adopted as part of the task region. Such an object filter can prevent unnecessarily large task regions.

As a further option, algorithms such as structure from motion (SfM), SLAM or dense matching, optionally based on deep learning algorithms, are used in conjunction with a photographic capture of measurement surroundings. Thus, a point cloud representing objects to be surveyed is generated, for example, from the data of the images that are recorded during the movement along the path 204.

Optionally, the laser scanner 201 can automatically change into the position checking mode—either directly after completion of the scan of the first measurement surroundings or, e.g., if lifting or tilting by the user 202 is detected. Likewise, the laser scanner 201 can optionally automatically leave the position monitoring mode should placement at a potential or suitable measurement position be detected.

FIGS. 14*a-d* show developments of the coordinate measuring device 201 according to the second aspect of the invention or of the method.

Figure 14A:
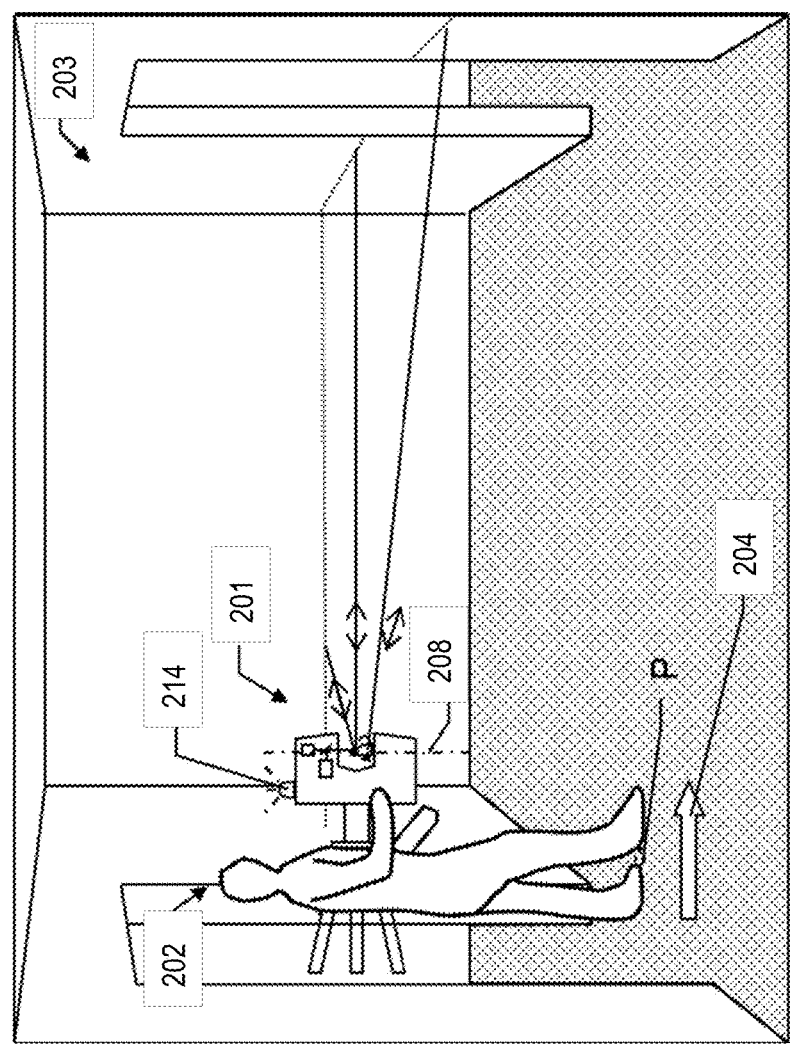
FIG. 14*a-d* illustrate developments of the coordinate measuring device 1 according to the second aspect of the invention or of the method.

FIG. 14*a* illustrates how, during continuous checking of the current position along the path 204, the user is, e.g., provided with information about the setup location suitability on the basis of a luminous display 214, e.g., in the form of an LED which shines in green for as long as suitability for setup location is present and which switches to red as soon as the check yields the current position P is unsuitable for a survey or unsuitable as a next setup location. As an alternative or in addition thereto, a warning sound is output when an unsuitable location is reached.

By way of example, during movement along the path 204, there is a detection by way of a continuous analysis of the continuously updated outline as to whether the clear view of the last measurement region and/or task region is obstructed, for example if the laser scanner 201 leaves the room, as shown in FIG. 13.

In this case, the user 202 can be prompted, for example, to perform a new stationary scan from a position ascertained as suitable. Likewise, the user can receive a warning should they exceed a certain distance from the last setup location or from the last measurement region. As illustrated in FIG. 2l3, the laser scanner 201 can to this end output optical or acoustic signals to the user 2 by means of the output unit 214, for example also to prompt said user to carry out a certain action, e.g., return to the last suitable position specifying the direction and distance or display this sought after setup location on a representation of the ascertained outline. By way of example, the output unit 214 can have a display field for outputting text notification or graphics (e.g., an outline). By way of example, it is also possible to indicate to the user when the upper part 210 needs to be rotated.

Figure 14B:
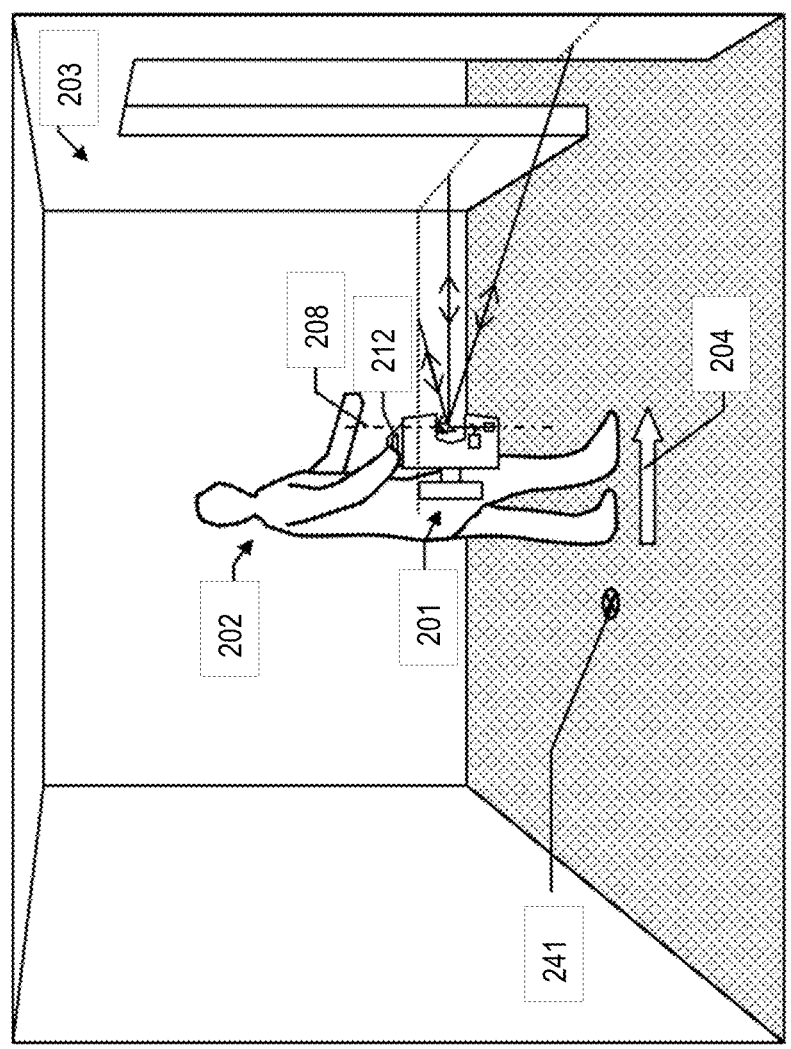

FIG. 14b shows a position change with a further exemplary embodiment of the laser scanner 201. In this case, this is a portable laser scanner 201, which has a (e.g., handle-shaped) handle 212 to allow the user 202 to carry it. Said handle is advantageously attached to the upper part in such a way that the laser scanner 201 is portable when tilted through 90° and the profiling is able to be carried out within the scope of the position testing method. Preferably, such a handle 212 can have a stabilized two-axis Cardan-type joint to automatically align the transverse axis 208 with the direction of the gravitational acceleration when the laser scanner 201 is held by the handle 212. Alternatively, the laser scanner 201 could also have a rotary joint in the handle 212 and active levelling by the vertical axis.

Figure 14C:
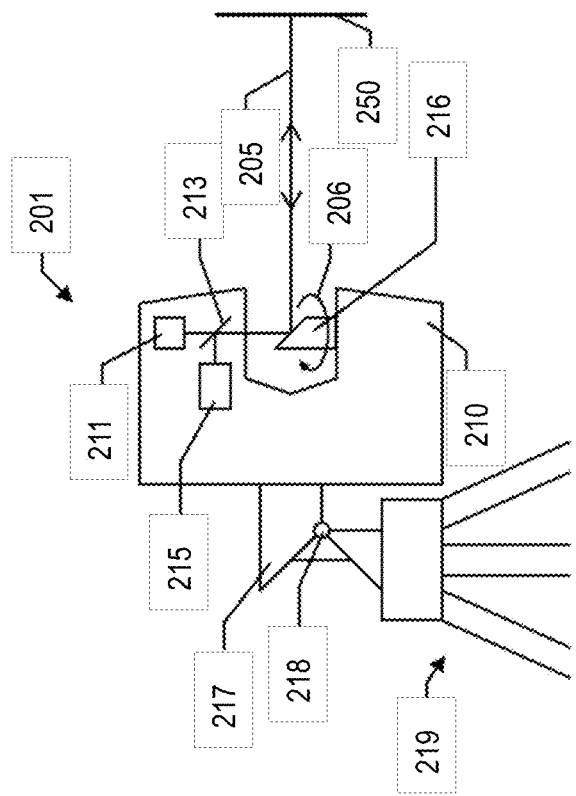

FIG. 14c shows a further exemplary embodiment of the laser scanner 201. The latter has means for tilting the upper part 210 through 90°. In this example, said means are configured as a hinge 218 that is attached to the base 217. Thus, tilting of the entire laser scanner 1 by a user can be dispensed with as a result of tilting the upper part 210; this may be advantageous, particularly in the case of large and heavy scanners.

Either the hinge 218 can be operable by a user—in particular, tilting can then put the laser scanner 201 into the profiler mode in that case—or said hinge can automatically tilt the upper part 210, in particular in motor-driven fashion.

Figure 14D:
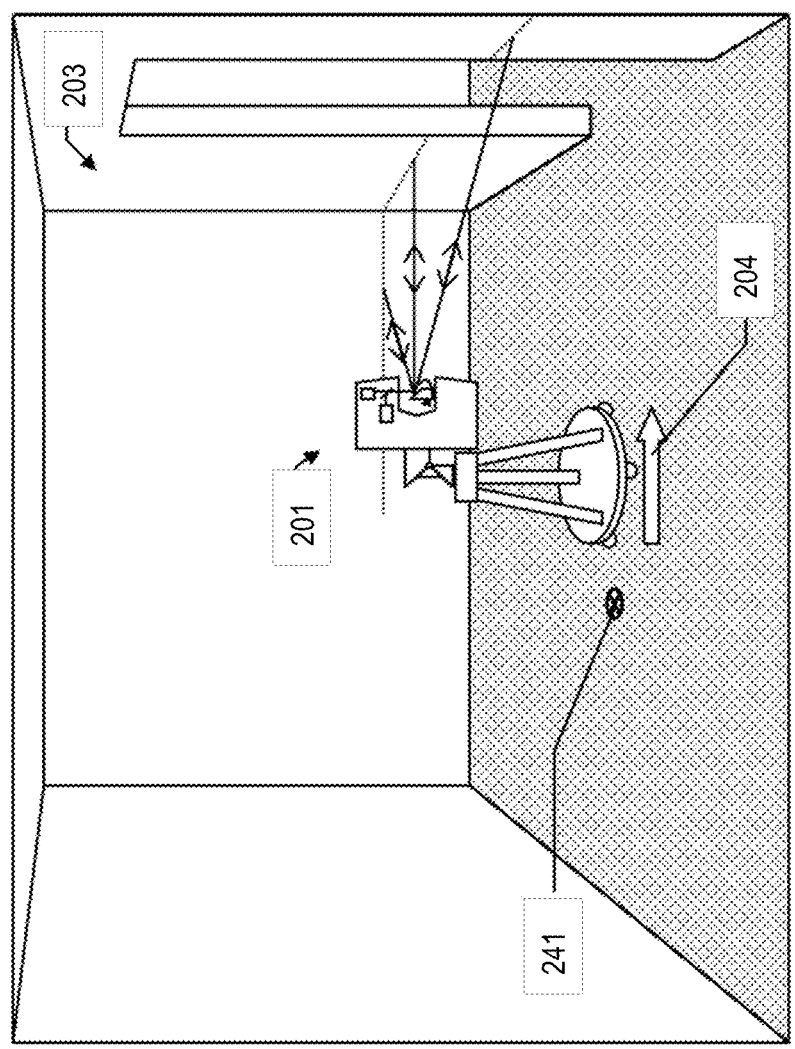

As illustrated in FIG. 14d, this embodiment of the laser scanner 201 preferably has a movable design, i.e., in particular, it can have wheels or rollers or be placed on a corresponding frame.

Optionally the measuring device 201 also has a controlled motor, in such a way that a previously ascertained suitable position and/or alignment of the device 201 can be adopted by the device 201 itself in automated fashion.

It is understood that these illustrated figures only schematically present possible exemplary embodiments. The various approaches can just as easily be combined with one another and with methods and devices from the prior art.

What is claimed is:

1. A fully automatic method for determining the current, geo-referenced position and alignment of a terrestrial surveying device with scan functionality at a current location based on a set of stored, geo-referenced three-dimensional (3D) scan panoramic images, the method comprising:
    recording a panoramic image with the surveying device from the current location, the recorded panoramic image comprising a plurality of object points;
    identifying at least one 3D scan panoramic image with a plurality of object points corresponding to the recorded panoramic image by means of image matching;
    determining respective geo-referenced 3D coordinates of the corresponding plurality of object points in the recorded panoramic image on the basis of the identified 3D scan panoramic image; and
    calculating a current geo-referenced position and alignment of the surveying device based on the positions of the corresponding plurality of object points in the recorded panoramic image and their determined geo-referenced 3D coordinates.

2. The method according to claim 1, wherein the stored 3D scan panoramic images are each based on two-dimensional (2D) panoramic images and associated 3D point clouds or the recorded panoramic image is a 2D image.

3. The method according to claim 1, wherein the stored 3D scan panoramic images each comprise color channels based on digital photography and a depth channel based on laser scanning.

4. The method according to claim 1, wherein the stored 3D scan panoramic images are in the form of cubic or spherical projections.

5. The method according to claim 1, wherein the set of stored 3D scan panoramic images comprise spatially interlinked images of a surrounding region forming a unit.

6. The method according to claim 1, further comprising:
    moving the surveying device the current location along a path to a second location; and
    continuously recording a series of images with the surveying device as the surveying device is moved using a SLAM process, wherein the identified 3D scan panoramic image is employed as an image of the image series,
    wherein the image series of the SLAM process is completed by recording a final image at the second location,
    wherein a 3D point cloud is recorded at the second location by means of the surveying device, and
    the 3D point cloud is registered on the basis of the SLAM process relative to the identified 3D scan panoramic image.

7. A method according to claim 1, wherein the number of stored 3D scan panoramic images to be employed for the location determination is adjusted to the existing measurement situation.

8. A method according to claim 7, wherein in the context of the adjustment, the number of stored 3D scan panoramic images to be used for the location determination is set depending on a measure of the similarity between the recorded panoramic image and the identified 3D scan panoramic image.

9. A method according to claim 8, the measure of similarity represents a measure for a difference in position between the current location and the recording location of the respective, identified 3D scan panoramic image.

10. A method according to claim 7, wherein in the context of the adjustment, the number of stored 3D scan panoramic images used for the location determination is set based on a character of the surroundings of the current location determined on the basis of the recorded panoramic image.

11. A method according to claim 7, wherein in the context of the adjustment, the number of stored 3D scan panoramic images used for the location determination is set depending on a desired degree of precision for the position or alignment to be determined.

12. The method according to claim 1, wherein the image matching is based on machine learning, deep learning, or corresponding object points are determined by means of feature matching algorithms.

13. The method according to claim 1, wherein the calculation of the current location takes place by means of re-sectioning.

14. A terrestrial surveying device with scan functionality and with a control and evaluation unit that is configured to perform the method of claim 1.

15. A computer program product that is stored on a non-transitory machine-readable program code that is suitable for carrying out the method according to claim 1.

* * * * *